(12) United States Patent
Barmichev et al.

(10) Patent No.: US 11,926,431 B2
(45) Date of Patent: Mar. 12, 2024

(54) ATTACHMENT COUPLERS FOR REMOVABLE AUXILIARY AIRCRAFT FUEL TANKS

(71) Applicant: The Boeing Company, Chicago, IL (US)

(72) Inventors: Sergey D. Barmichev, Kirkland, WA (US); Gary P. Seagrave, Everett, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 17/570,293

(22) Filed: Jan. 6, 2022

(65) Prior Publication Data

US 2022/0250761 A1    Aug. 11, 2022

Related U.S. Application Data

(60) Provisional application No. 63/147,220, filed on Feb. 8, 2021.

(51) Int. Cl.
*B64D 37/04* (2006.01)
*B64D 37/08* (2006.01)

(52) U.S. Cl.
CPC ............. *B64D 37/04* (2013.01); *B64D 37/08* (2013.01)

(58) Field of Classification Search
CPC ........ B64D 37/04; B64D 37/08; B64D 37/00; B64D 9/00; B64D 9/003; B64C 1/20
See application file for complete search history.

(56) References Cited

U.S. PATENT DOCUMENTS

| | | | |
|---|---|---|---|
| 2008/0302913 A1* | 12/2008 | Griess | B64C 1/20 244/119 |
| 2015/0107682 A1* | 4/2015 | Kirk | B64C 1/20 137/376 |

* cited by examiner

*Primary Examiner* — Richard Green
*Assistant Examiner* — Ashesh Dangol
(74) *Attorney, Agent, or Firm* — Duft & Bornsen, PC

(57) ABSTRACT

Coupler assemblies are described that removably couple sides of an auxiliary fuel tank in a cargo area of an aircraft. In one embodiment, a first coupler of the coupler assemblies includes a first attachment member that supports a body with a hollow channel having a centerline disposed longitudinally in the fuselage between a first end and a second end, and a slot between an outer surface of the body and the hollow channel. A second coupler of the coupler assemblies includes an engagement member, a second attachment member, and an arm extending between the engagement member and the second attachment member. The engagement member is slidably received within the hollow channel from the first end, and fits slidably within the hollow channel to engage with the body of the first coupler, with the arm extending through the slot.

20 Claims, 32 Drawing Sheets

ATTACHMENT COUPLERS FOR REMOVABLE AUXILIARY AIRCRAFT FUEL TANKS

RELATED APPLICATIONS

This non-provisional patent application claims priority to U.S. Provisional Patent Application No. 63/147,220 filed on Feb. 8, 2021, which is incorporated by reference as if fully provided herein.

FIELD

This disclosure relates to the field of auxiliary aircraft fuel tanks, and in particular, to removable fuel tanks that are placed into cargo holds of aircraft.

BACKGROUND

Some long-range cargo aircraft utilize auxiliary fuel tanks in order to increase the range of the aircraft. These fuel tanks are typically removable in order to allow for a variable number of tanks to be installed depending on the mission of the aircraft. During the installation process, multiple fuel tanks may be loaded into the cargo hold of an aircraft, one at a time, with each positioned between the tail and the nose in order to achieve a desired weight and balance for the aircraft and a desired fuel load capability for the aircraft.

The fuel tanks typically include tank couplers that mate with fuselage couplers mounted to the fuselage. The tank couplers and the fuselage couplers interlock together to secure the fuel tank to the aircraft. During installation and removal of the fuel tanks, the fuselage couplers and the tank couplers may interfere with each other along a horizontal plane, which is solved in these cases by raising the fuel tanks during installation and removal to allow a clearance between the couplers as the fuel tanks are moved fore and aft through the fuselage.

However, raising the fuel tanks during installation and removal may increase the risk that the top of the fuel tanks contact a ceiling in the cargo hold, which may cause damage to the aircraft and/or to the fuel tanks. In addition, the height of the fuel tanks is reduced to accommodate the clearance used to allow the tank couplers to pass by the fuselage couplers then the fuel tanks have not yet reached their final position in the fuselage, which reduces the amount of fuel that the tanks can hold.

Based on the forgoing discussion, it therefore remains desirable to improve the installation and removable of auxiliary fuel tanks in aircraft.

SUMMARY

Coupler assemblies are described that removably couple sides of an auxiliary fuel tank in a cargo area of an aircraft. The coupler assemblies include a coupler that mounts to the fuselage and a coupler that mounts to the auxiliary fuel tank, with the couplers being horizontally transparent to each other in the fore-aft direction during installation and removal of the fuel tanks. Because the couplers are horizontally transparent with respect to each other, the auxiliary fuel tanks can be repositioned within the fuselage past different fuel tank attachment points in the fuselage without a vertical translation to provide clearance spacing between the couplers, thereby providing a number of technical benefits over prior fuel tank attachment systems, including preventing accidental damage to the fuel tanks and allowing for the use of taller fuel tanks that can hold more fuel.

One embodiment comprises an apparatus for removably securing an auxiliary fuel tank in a cargo area of an aircraft. The apparatus includes a plurality of coupler assemblies that removably couple sides of the auxiliary fuel tank to a fuselage of the aircraft. Each of the coupler assemblies includes a first coupler and a second coupler. The first coupler includes a first attachment member that supports a body with a hollow channel having a centerline disposed longitudinally in the fuselage between a first end and a second end, and a slot between an outer surface of the body and the hollow channel. The second coupler includes an engagement member, a second attachment member, and an arm extending between the engagement member and the second attachment member. The engagement member is slidably received within the hollow channel from the first end, and fits slidably within the hollow channel to engage with the body of the first coupler, with the arm extending through the slot.

Another embodiment comprises a method for removably securing an auxiliary fuel tank in a cargo area of an aircraft. The method comprises installing a plurality of coupler assemblies that removably couple sides of the auxiliary fuel tank to a fuselage of the aircraft, where each of the coupler assemblies includes a first coupler and a second coupler. The first coupler includes a first attachment member that supports a body with a hollow channel having a centerline disposed longitudinally in the fuselage between a first end and a second end, and a slot between an outer surface of the body and the hollow channel. The second coupler includes an engagement member, a second attachment member, and an arm extending between the engagement member and the second attachment member. The method further comprises sliding the engagement member within the hollow channel from the first end, and engaging the engagement member within the hollow channel of the body of the first coupler, with the arm extending through the slot.

Another embodiment comprises an aircraft that includes a fuselage, an auxiliary fuel tank, a first coupler assembly, and a second coupler assembly. The first coupler assembly removably secures a first side of the auxiliary fuel tank to the fuselage in a manner that allows for a single degree of movement between the auxiliary fuel tank and the fuselage. The second coupler assembly removably secures a second side of the auxiliary fuel tank to the fuselage in a manner that allows for two degrees of movement between the auxiliary fuel tank and the fuselage. Each of the first coupler assembly and the second coupler assembly comprises a first coupler and a second coupler. The first coupler includes a first attachment member that supports a body with a hollow channel having a centerline disposed longitudinally in the fuselage between a first end and a second end, and a slot between an outer surface of the body and the hollow channel. The second coupler includes an engagement member, a second attachment member, and an arm extending between the engagement member and the second attachment member. The engagement member is slidably received within the hollow channel from the first end, and fits slidably within the hollow channel to engage with the body of the first coupler, with the arm extending though the slot.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
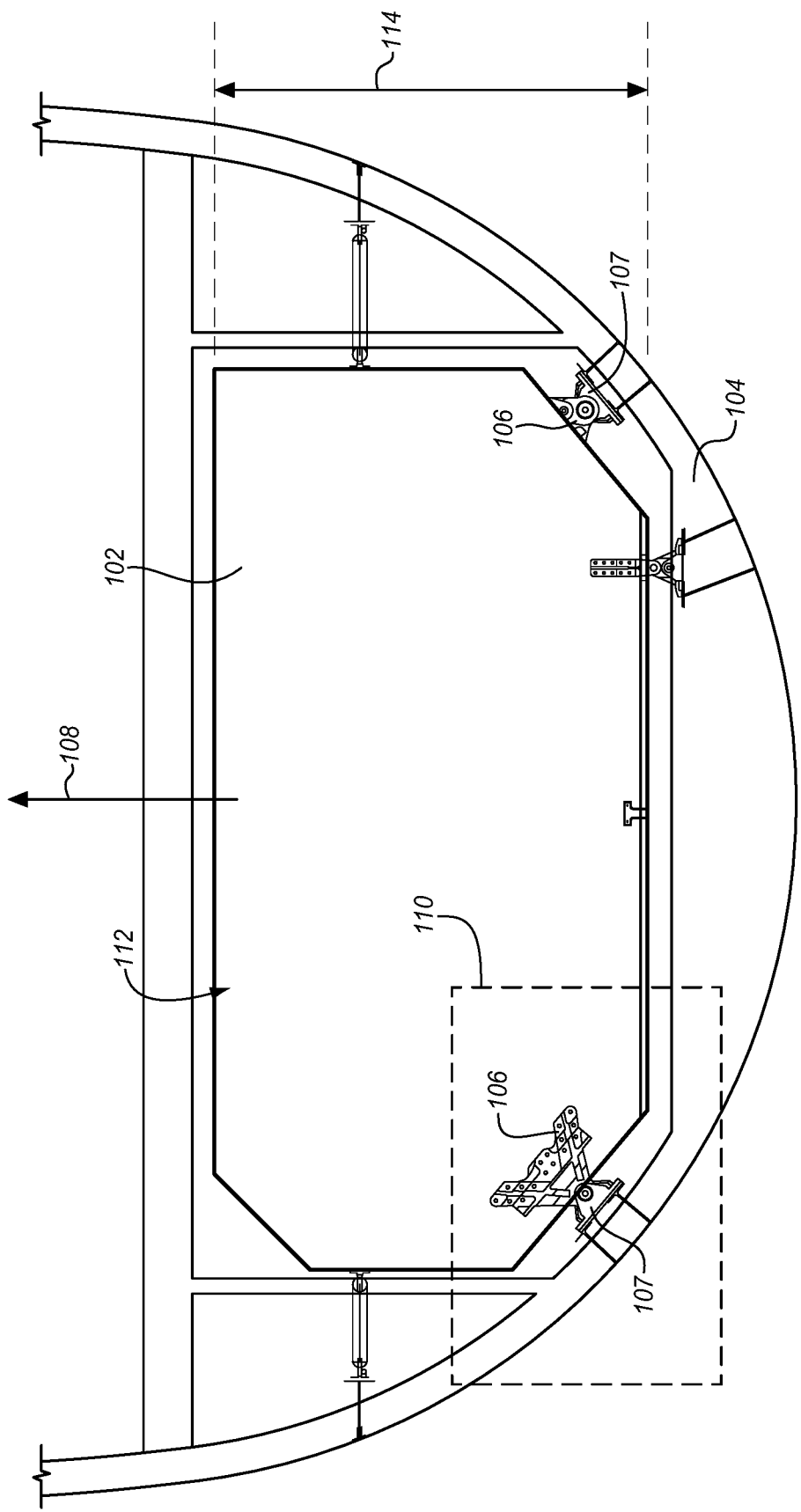
FIG. 1 is a mechanical drawing of an auxiliary fuel tank mounting system in the prior art.
Figure 2:
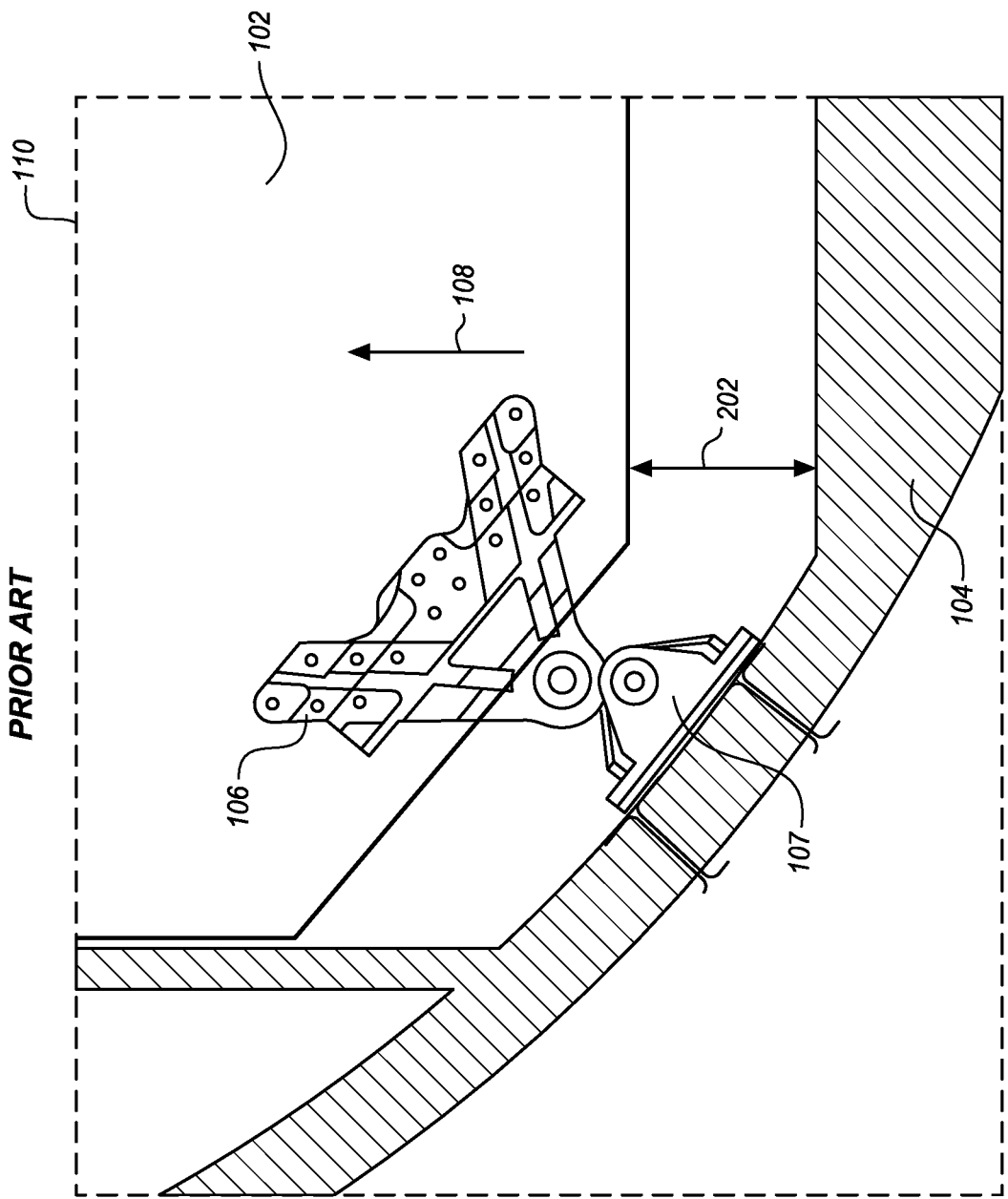
FIG. 2 depicts a view of a region in FIG. 1.

FIG. 1 is a mechanical drawing of an auxiliary fuel tank mounting system in the prior art. FIG. 1 illustrates a fuel tank 102, that is removably coupled to a lower portion of a fuselage 104 using couplers 106-107 that interlock and mate together. Coupler 106 is attached to fuel tank 102, and coupler 107 is attached to fuselage 104. The view in FIG. 1 is in a longitudinal direction along fuselage 104 in the fore-aft direction for an aircraft. During an installation process for fuel tank 102, fuel tank 102 is translated in the fore direction (into the page in FIG. 1) to move fuel tank 102 into position within fuselage 104. As fuel tank 102 is moved into position, fuel tank 102 is raised in the direction of arrow 108 to allow couplers 106 attached to fuel tank 102 to pass by couplers 107 attached to fuselage 104, as depicted in FIG. 2. FIG. 2 is a view of region 110 of FIG. 1, which illustrates how fuel tank 102 is raised in the direction of arrow 108 to allow a spacing 202 between coupler 106 attached to fuel tank 102 and coupler 107 attached to fuselage 104 as fuel tank 102 is moved through fuselage 104. This activity may cause problems when fuel tank 102 is installed, removed, or moved within fuselage 104, as a top portion 112 (see FIG. 1) of fuel tank 102 may contact portions of fuselage 104. Further, a height 114 of fuel tank 102 (see FIG. 1) may be limited based on spacing 202 used to enable fuel tank 102 to be moved into position, since spacing 202 raises top portion 112 of fuel tank 102 during the installation and removal process. Typically, height 114 of fuel tank 102 is reduced to accommodate for spacing 202, which reduces the amount of fuel that may be stored in fuel tank 102.

Figure 3:
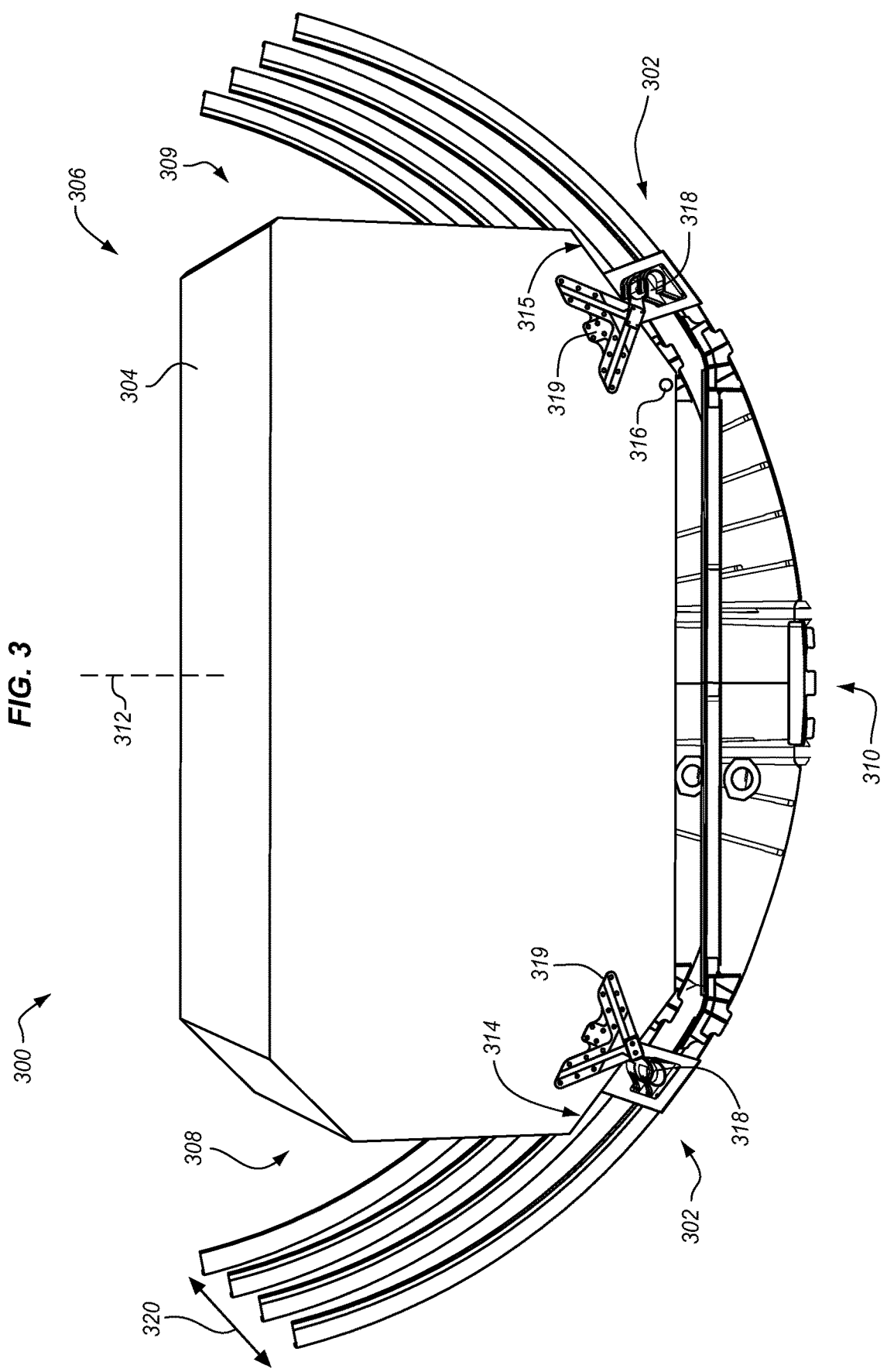
FIGS. 3-6 are isometric views of an apparatus that includes a plurality of coupler assemblies that removably secure an auxiliary fuel tank to a cargo area of an aircraft in an illustrative embodiment.
Figure 4:
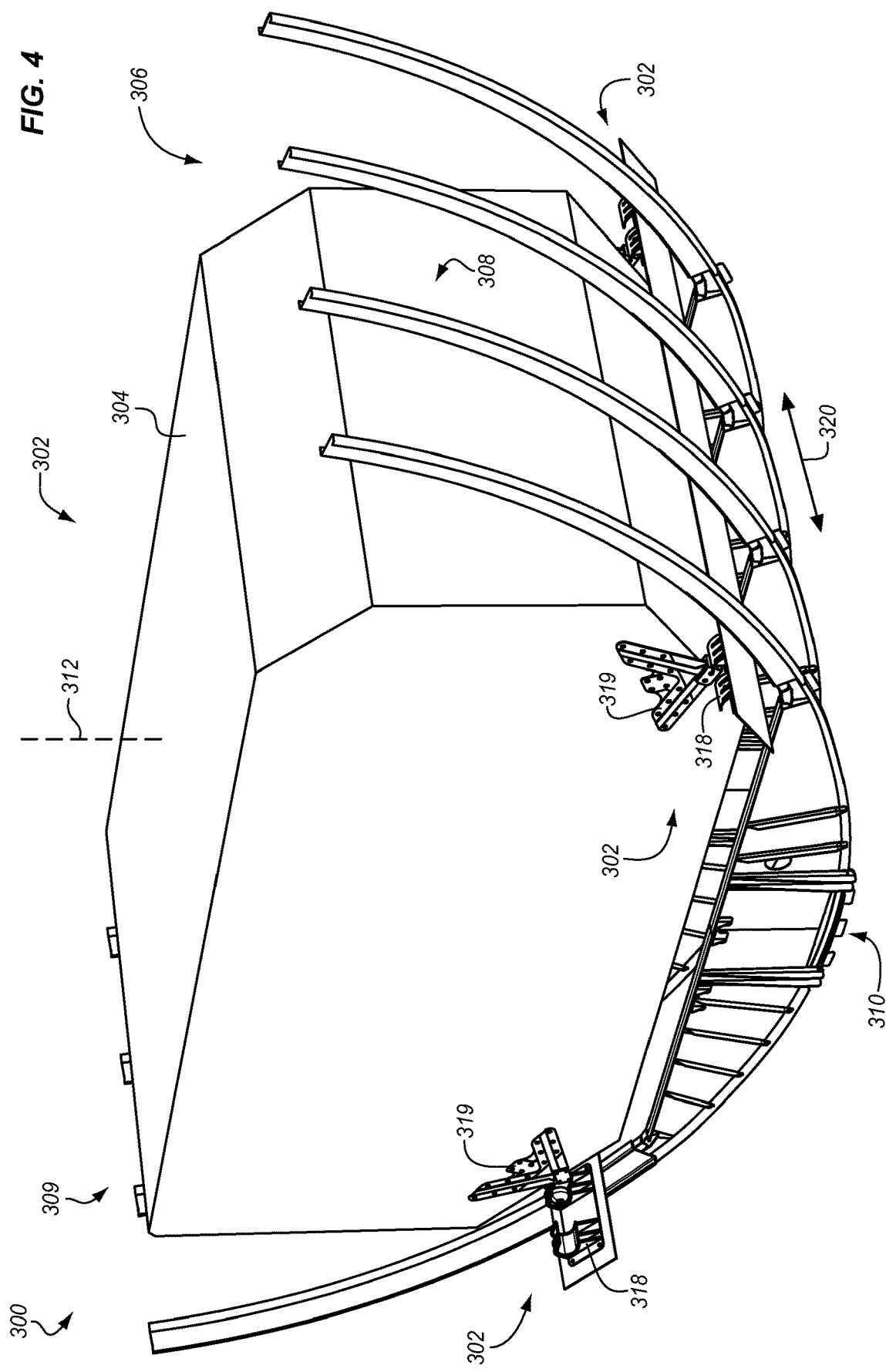
Figure 5:
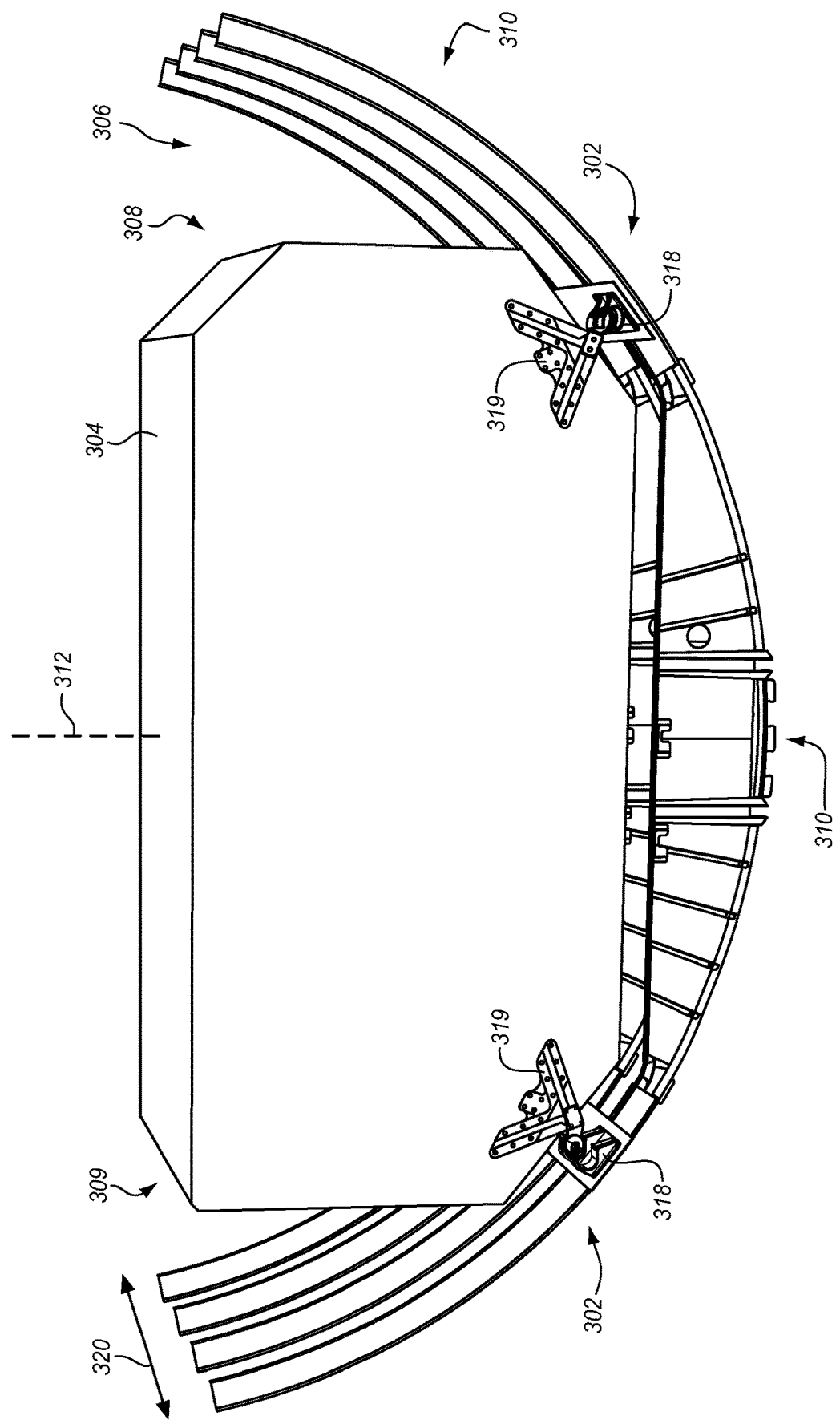
Figure 6:
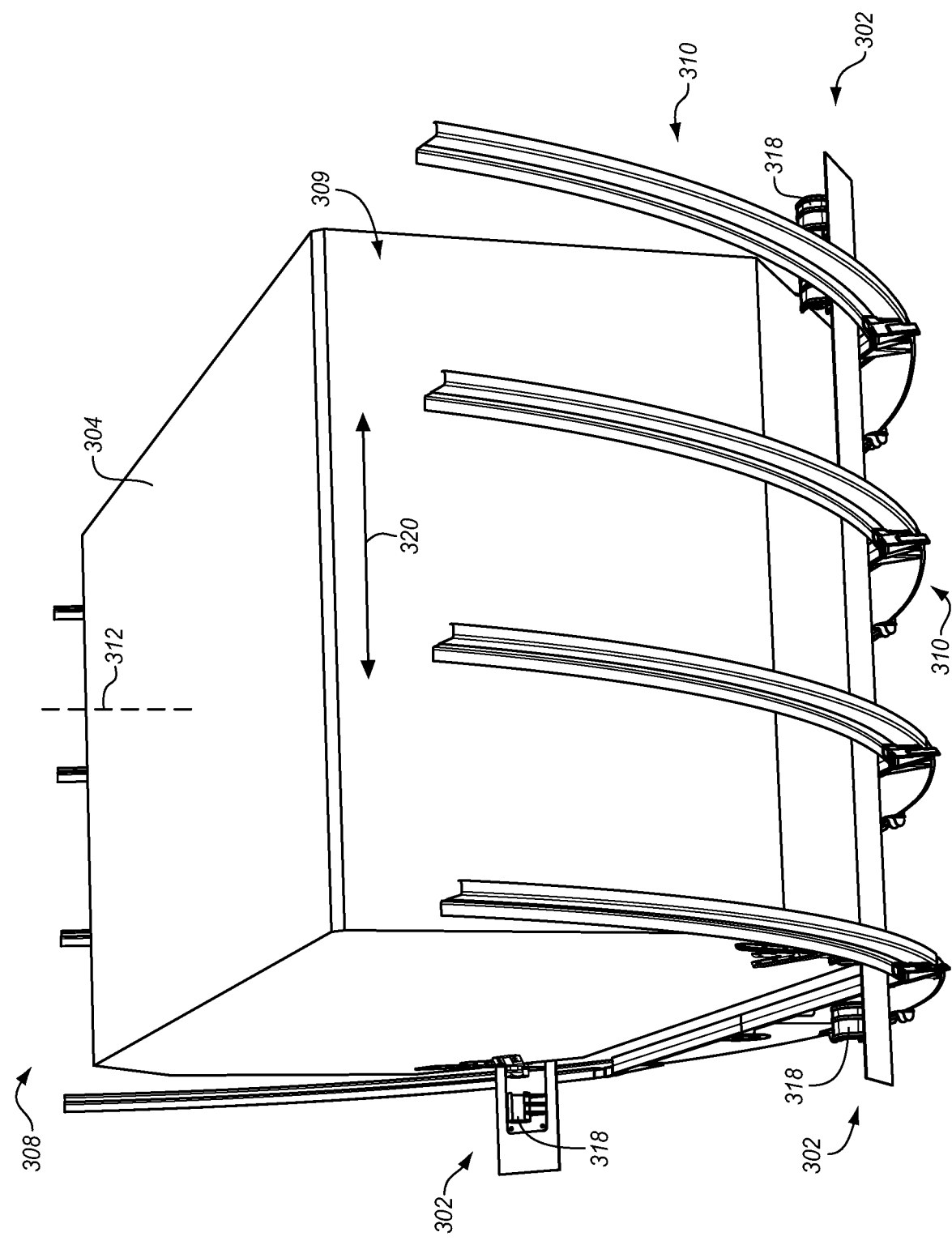

FIG. 3 is an isometric view of an apparatus 300 that includes a plurality of coupler assemblies 302 that removably secure an auxiliary fuel tank 304 to a cargo area 306 of an aircraft in an illustrative embodiment, and FIGS. 4-6 depict rotated views of FIG. 1 along an axis 312 in illustrative embodiments. In this embodiment, coupler assemblies 302 removably couple sides 308-309 of auxiliary fuel tank 304 to a fuselage 310 of the aircraft.

In this embodiment, coupler assemblies 302 are located at beveled edges 314-315 of auxiliary fuel tank 304. Beveled edges 314-315 form a relief between the relatively rectangular shape of auxiliary fuel tank 304 and the cylindrically shaped fuselage 310. In this embodiment, auxiliary fuel tank 304 includes a fuel connection 316 proximate to side 309 of auxiliary fuel tank 304, which is used to remove fuel from auxiliary fuel tank 304 during flight operations. The location of fuel connection 316 on auxiliary fuel tank 304 may be different in other embodiments as a matter of design choice.

In this embodiment, coupler assemblies 302 collectively include a first coupler 318, which is mounted to fuselage 310 in this embodiment, and a second coupler 319, which is mounted to auxiliary fuel tank 304 in this embodiment. In other embodiments, first coupler 318 may be mounted to auxiliary fuel tank 304 and second coupler 319 may be mounted to fuselage 310. This will be discussed later. Generally, different sets of first couplers 318 may be mounted to fuselage 310 in order to allow multiple auxiliary fuel tanks 304 to be installed in the aircraft. During installation and removal, auxiliary fuel tank 304 may translate through different spaced-apart sets of first couplers 318 (or second couplers 319 if second couplers 319 are mounted to fuselage 310) as auxiliary fuel tank 304 is moved longitudinally 320 (e.g., fore and aft along fuselage 310), which in prior tank coupler systems entailed raising the fuel tanks in order to prevent the interference between the tank couplers and the fuselage couplers.

In the embodiments described herein, coupler assemblies 302 allow auxiliary fuel tank 304 to be moved longitudinally 320 (i.e., fore and aft in the aircraft) along fuselage 310 during installation and removal without raising auxiliary fuel tank 304, because first coupler 318 and second coupler 319 are transparent with respect to each other longitudinally 320.

Figure 7:
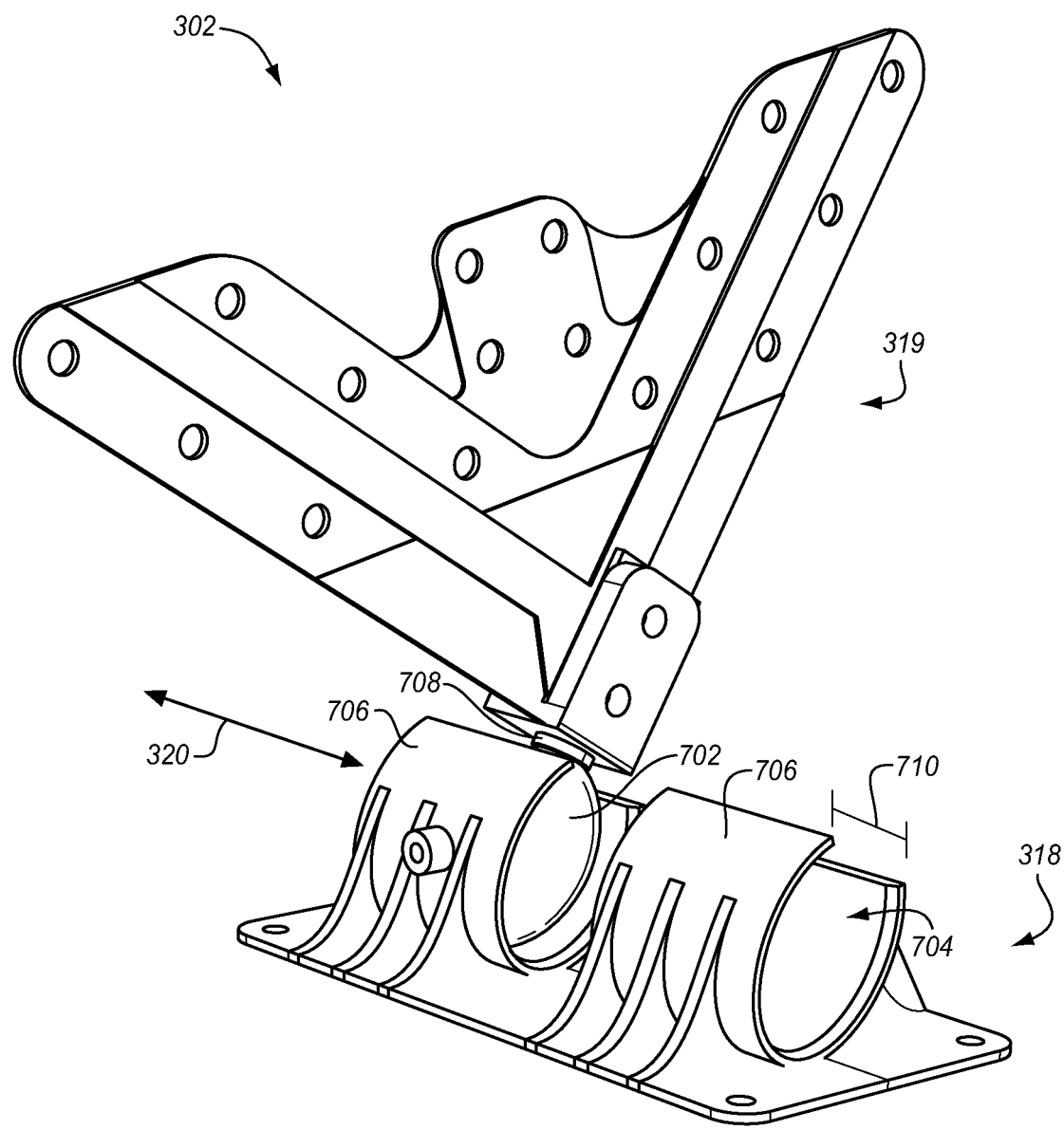
FIG. 7 depicts an isometric view of a coupler assembly in an illustrative embodiment.

FIG. 7 is an isometric view of coupler assembly 302 in an illustrative embodiment. Coupler assembly 302 in FIG. 7 may be referred to as a first coupler assembly in some embodiments. In this embodiment, first coupler 318 mounts to fuselage 310 and second coupler 319 mounts to auxiliary fuel tank 304. Second coupler 319 includes an engagement member 702, which slides through a hollow channel 704 of at least one body 706 of first coupler 318 as auxiliary fuel tank 304 is moved longitudinally 320 through fuselage 310. Generally, engagement member 702 fits slidably within hollow channel 704 to engage with body 706 of first coupler 318. In this embodiment, second coupler 319 includes an arm 708 that supports engagement member 702. As auxiliary fuel tank 304 (not shown in FIG. 7) is moved longitudinally 320 through fuselage 310, a slot 710 in body 706 provides clearance between arm 708 and body 706, allowing engagement member 702 to slidably engage within hollow channel 704 of body 706.

Figure 8:
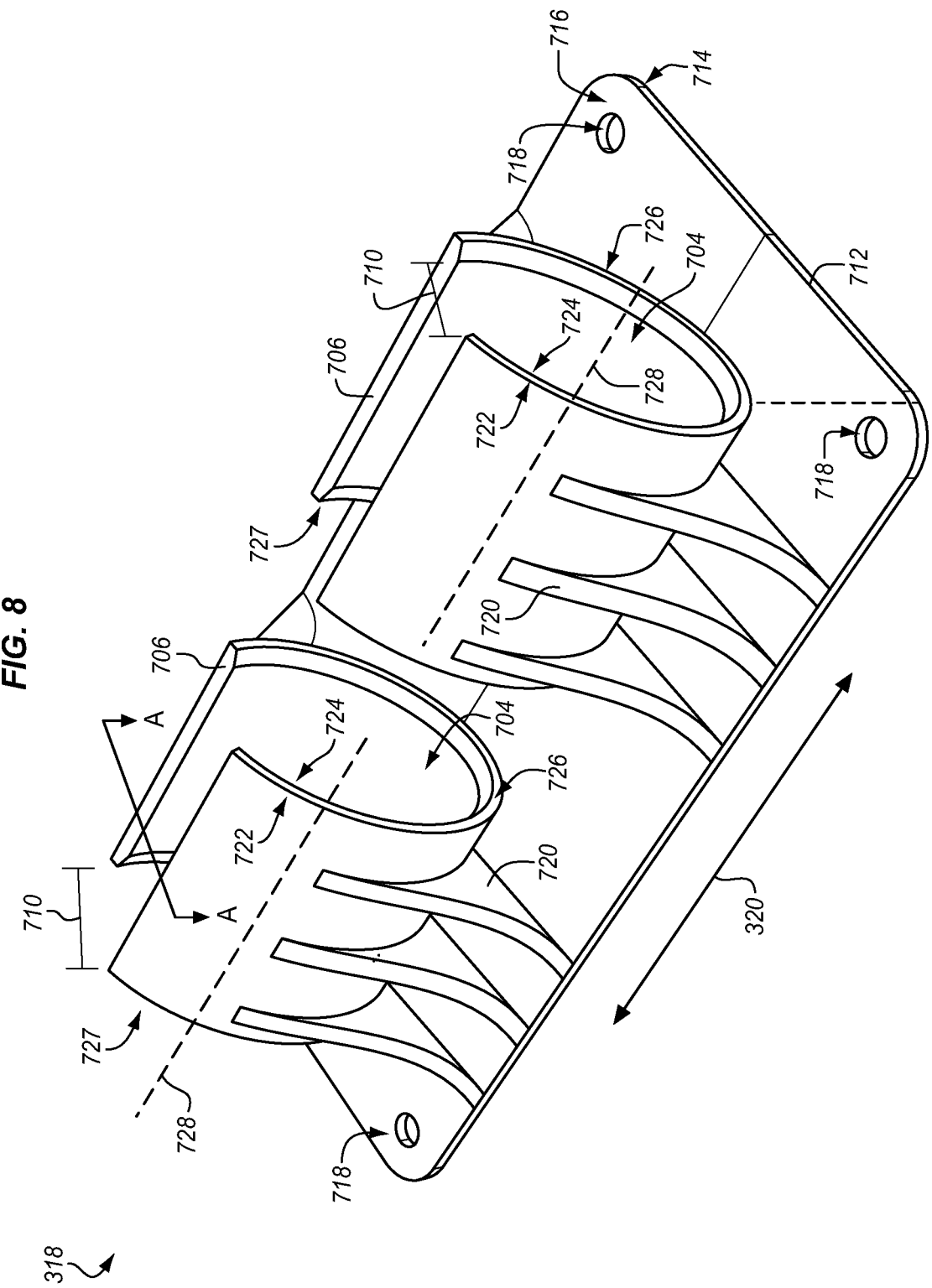
FIG. 8 depicts an isometric view of a first coupler of FIG. 7 in an illustrative embodiment.

FIG. 8 is an isometric view of first coupler 318 of FIG. 7 in an illustrative embodiment. In this embodiment, first coupler 318 includes a first attachment member 712 that couples to fuselage 310. First attachment member 712 supports at least one body 706 that may be spaced apart longitudinally 320 on first attachment member 712. First attachment member 712 may include more than one body 706 to allow multiple auxiliary fuel tanks 304 to be secured adjacent to one another by installing first coupler 318 at a single location in fuselage 310.

In this embodiment, first attachment member 712 has a side 714 that contacts fuselage 310, and a side 716 that is disposed away from side 714. First attachment member 712 may mount to fuselage 310 using mounting holes 718.

In this embodiment, first attachment member 712 supports body 706 using one or more ribs 720, which extend from side 716 of first attachment member 712 to partially circumscribe an outer surface 722 of body 706. Body 706 in this embodiment includes an inner surface 724 that defines hollow channel 704. Hollow channel 704 extends between a first end 726 and a second end 727 of body 706, with hollow channel 704 having a centerline 728 that is disposed longitudinally 320.

Body 706 in this embodiment includes slot 710 between outer surface 722 of body 706 and hollow channel 704, which provides clearance for arm 708 (see FIG. 7) and allow engagement member 702 on second coupler 319 to slidably engage within hollow channel 704 between ends 726-727. This will be discussed later.

Figure 9:
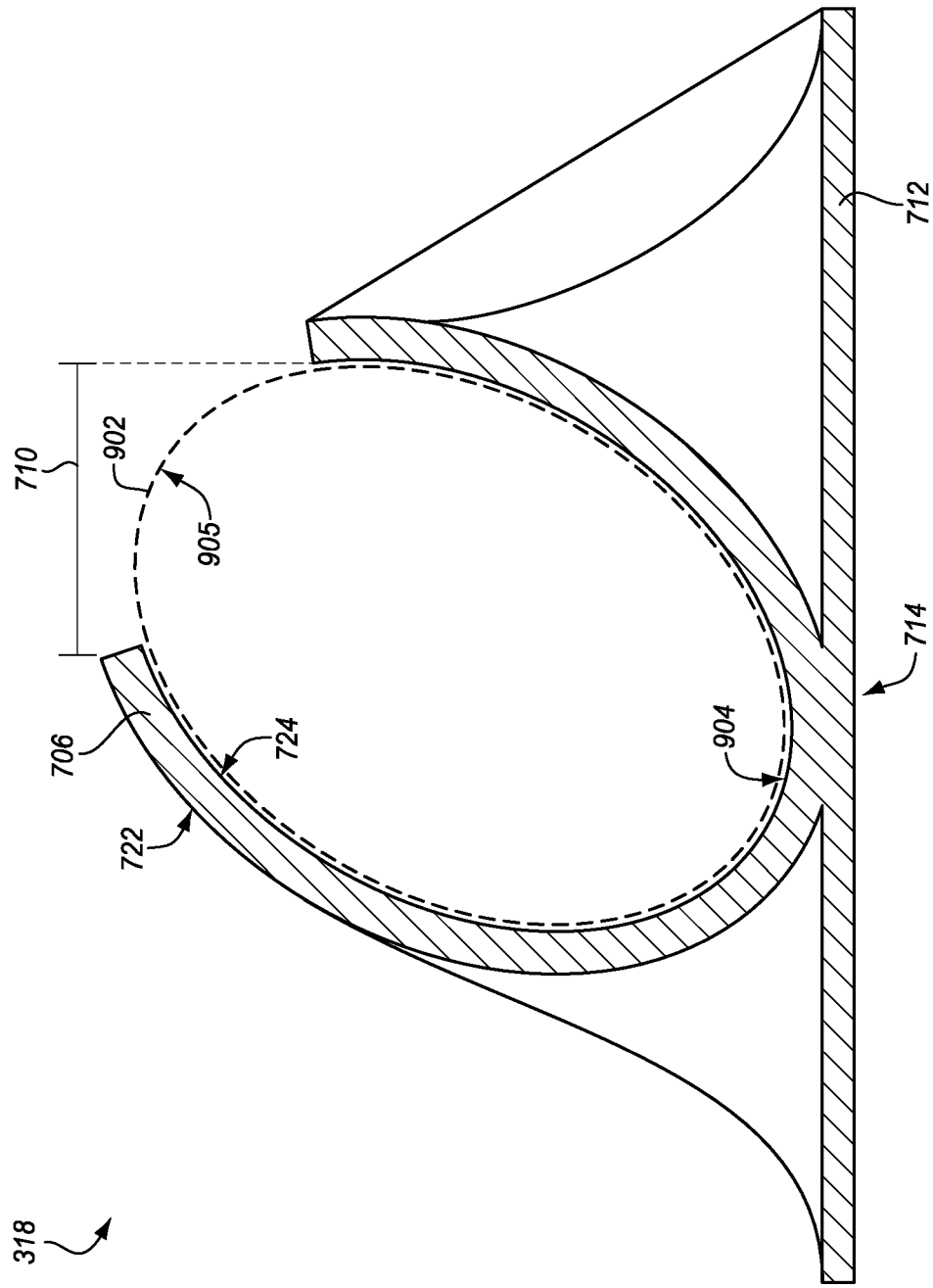
FIG. 9 is a cross-sectional view of the first coupler of FIG. 8 in an illustrative embodiment.

FIG. 9 is a cross-sectional view of first coupler 318 of FIG. 7 along cut lines A-A of FIG. 8 in an illustrative embodiment. In this embodiment, hollow channel 704 has an elliptical cross-section 902 that includes a first vertex 904 disposed proximate to first attachment member 712 and a second vertex 905 disposed proximate to slot 710. While elliptical cross-section 902 is depicted as having a specific rotation with respect to the planar surface of side 714 of first attachment member 712, elliptical cross-section 902 may have other rotations relative to side 714 in other embodiments.

Figure 10:
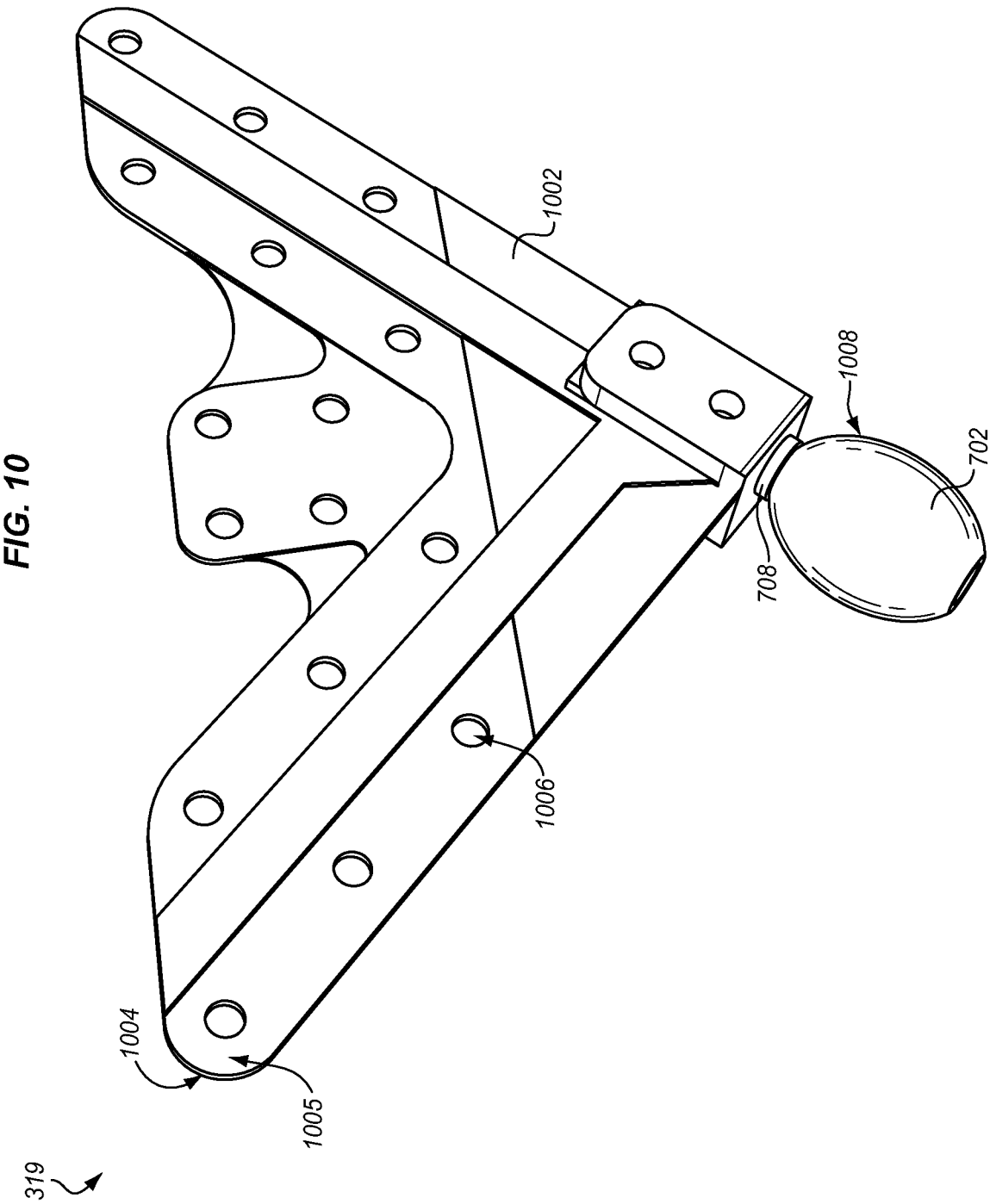
FIG. 10 is an isometric view of a second coupler of FIG. 7 in an illustrative embodiment.

FIG. 10 is an isometric view of second coupler 319 in an illustrative embodiment. In this embodiment, second coupler 319 includes a second attachment member 1002 that couples to auxiliary fuel tank 304. Arm 708 is coupled to engagement member 702, and extends between second attachment member 1002 and engagement member 702. In this embodiment, second attachment member 1002 has sides 1004-1005, each of which may be used to mount second attachment member 1002 to auxiliary fuel tank 304 using mounting holes 1006. In this embodiment, engagement member 702 has an elliptical shape 1008 that is sized to slidably fit within hollow channel 704 of body 706 (e.g., engagement member 702 may be dimensioned to correspond to elliptical cross-section 902 depicted in FIG. 9).

Figure 11:
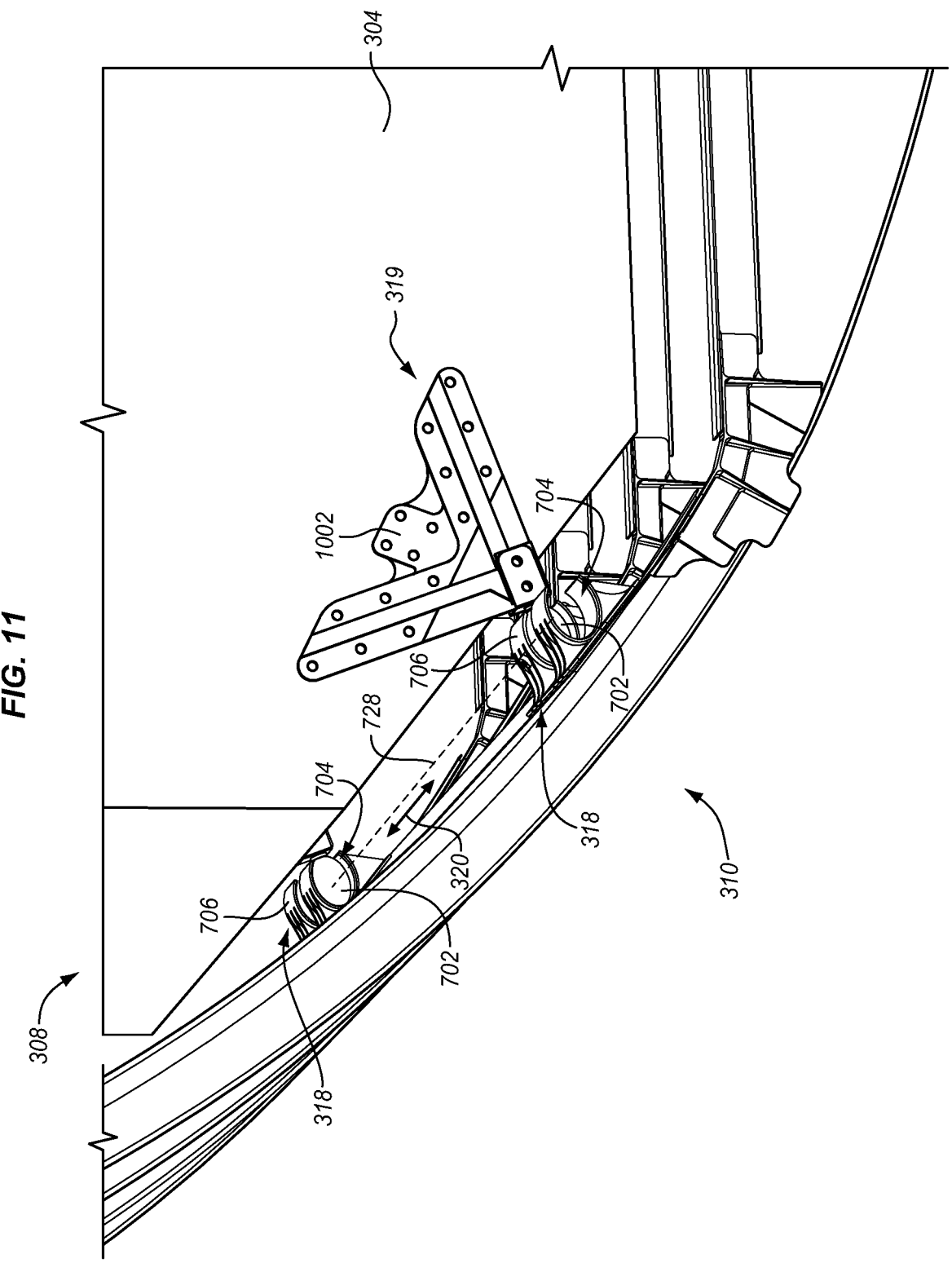
FIGS. 11-12 depict isometric views of a side of an auxiliary fuel tank in an illustrative embodiment.
Figure 12:
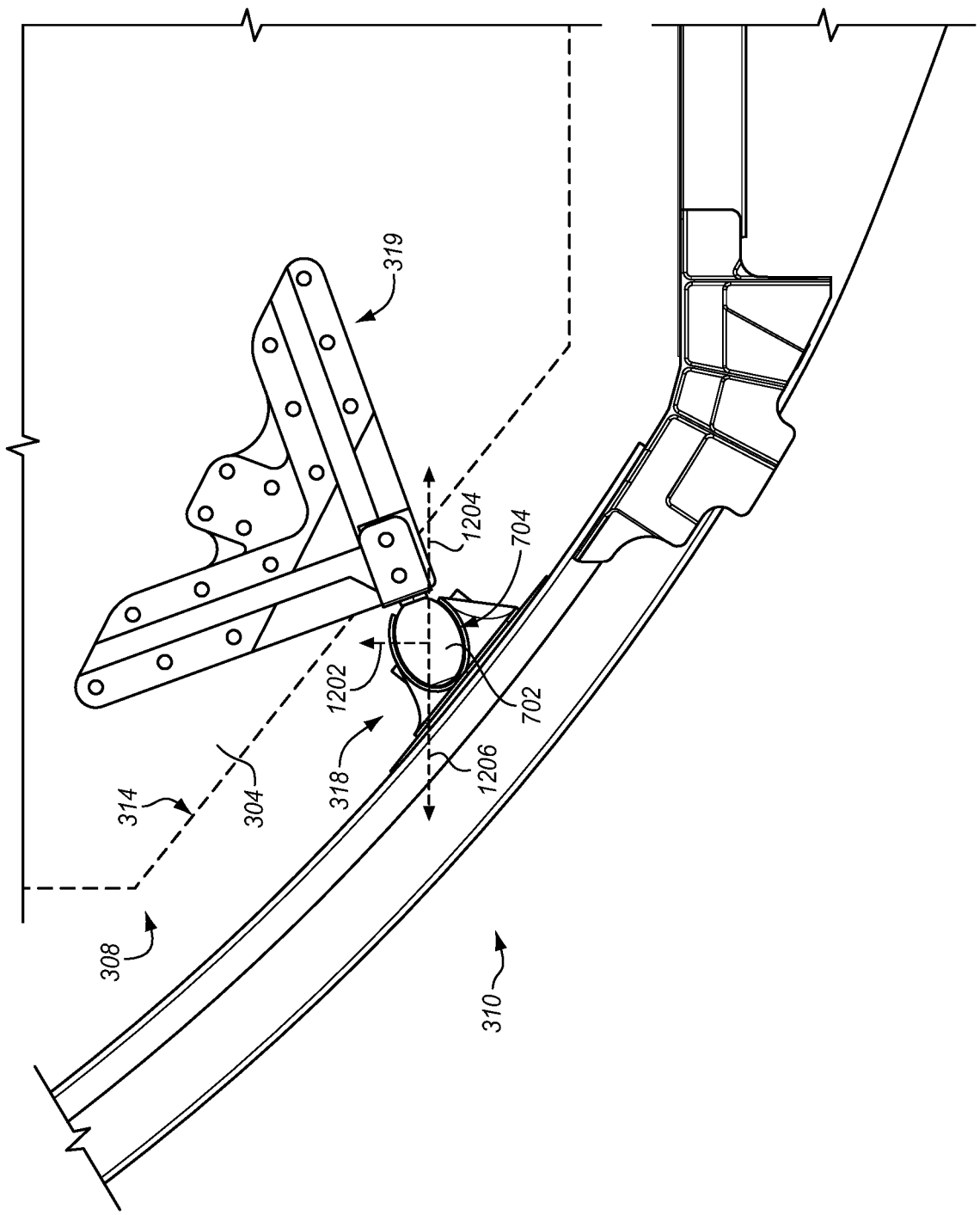

FIGS. 11-12 are isometric views of side 308 of auxiliary fuel tank 304 and coupler assemblies 302 of FIG. 7 in illustrative embodiments. FIG. 11 depicts that engagement members 702 are aligned on centerline 728 of hollow channel 704, which allows engagement members 702 to slide through hollow channels 704 of first couplers 318 as auxiliary fuel tank 304 moves longitudinally 320 through fuselage 310 (e.g., during installation and removal of auxiliary fuel tank 304 to positions either forward of the location shown in FIG. 11 or rearward of the location shown in FIG. 11).

In FIG. 12, the orientation of coupler assembly 302 at side 308 and the overall shape of engagement member 702 captured with hollow channel 704 prevents auxiliary fuel tank 304 from moving vertically in the direction of arrow 1202, or horizontally in either an inboard direction 1204 or an outboard direction 1206 of fuselage 310. Although this embodiment of coupler assembly 302 does allow auxiliary fuel tank 304 to move longitudinally 320 (into and out of the page in FIG. 12), this movement is prevented after installation of auxiliary fuel tank 304 using stay rods or other mechanical restraints that secure auxiliary fuel tank 304 to fuselage 310. The result is that the configuration at side 308 of auxiliary fuel tank 304 depicted in FIG. 12 secures side 308 of auxiliary fuel tank 304 in a manner that allows for a single degree of movement between auxiliary fuel tank 304 and fuselage 310 (e.g., longitudinally 320, which is into or out of the page in FIG. 12) prior to fixing auxiliary fuel tank 304 in place after installation.

Figure 13:
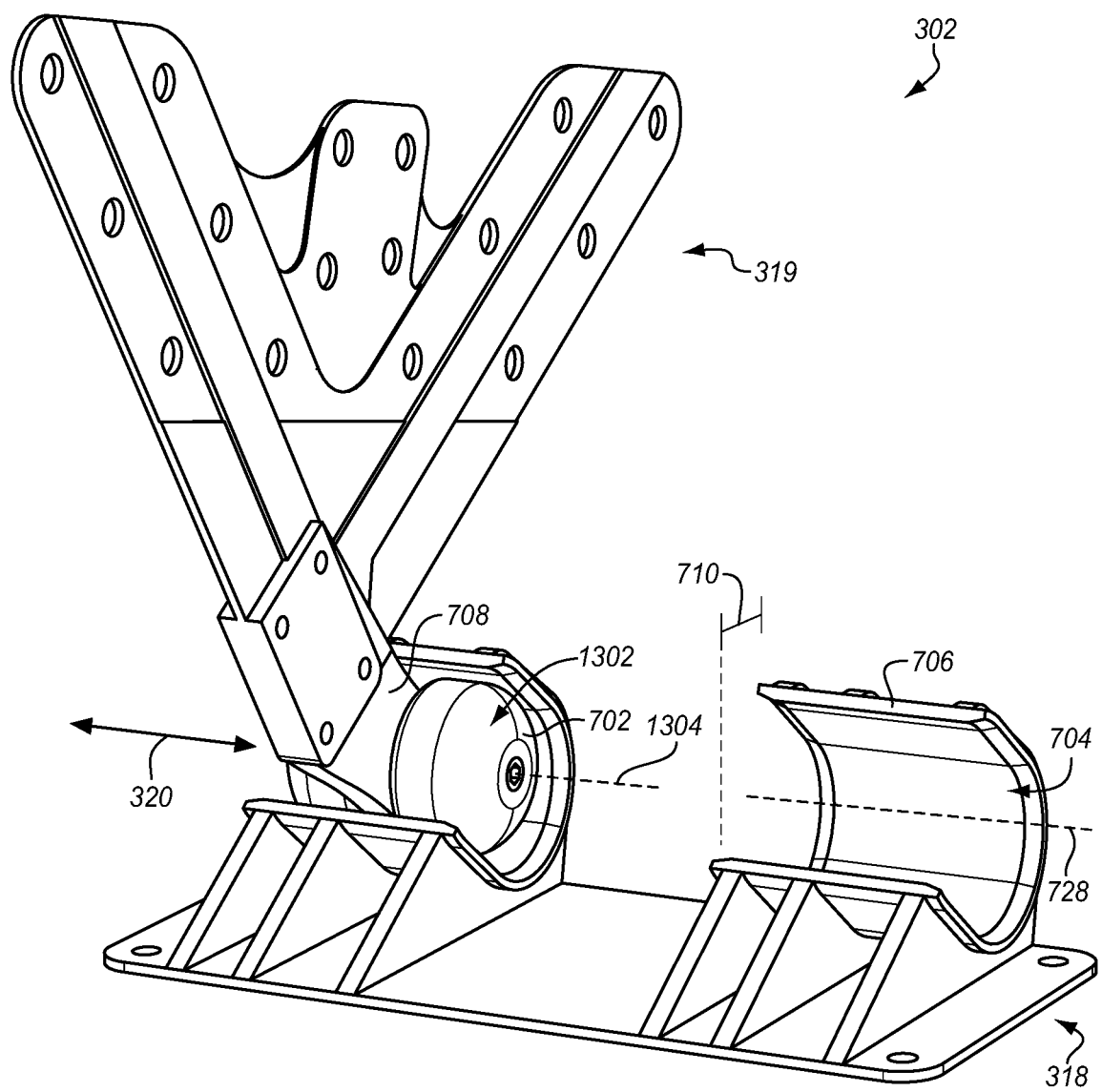
FIG. 13 is an isometric view of a coupler assembly in another illustrative embodiment.

FIG. 13 is an isometric view of coupler assembly 302 in another illustrative embodiment. Coupler assembly 302 in FIG. 13 may be referred to as a second coupler assembly in some embodiments. In this embodiment, first coupler 318 mounts to fuselage 310 and second coupler 319 mounts to auxiliary fuel tank 304. Second coupler 319 includes engagement member 702, which comprises one or more rollers 1302 in this embodiment. Roller(s) 1302 have an axis of rotation 1304 that is parallel with centerline 728 of hollow channel 704, and roller(s) 1302 slide through hollow channel 704 as auxiliary fuel tank 304 is moved longitudinally 320 through fuselage 310 during installation or removal of auxiliary fuel tank 304. Generally, roller(s) 1302 fit slidably within hollow channel 704 to engage with body 706 of first coupler 318. In this embodiment, arm 708 supports roller(s) 1302. As auxiliary fuel tank 304 moves longitudinally 320 in fuselage 310, slot 710 in body 706 provides clearance for arm 708, allowing roller(s) 1302 to slidably engage within hollow channel 704 of body 706.

Figure 14:
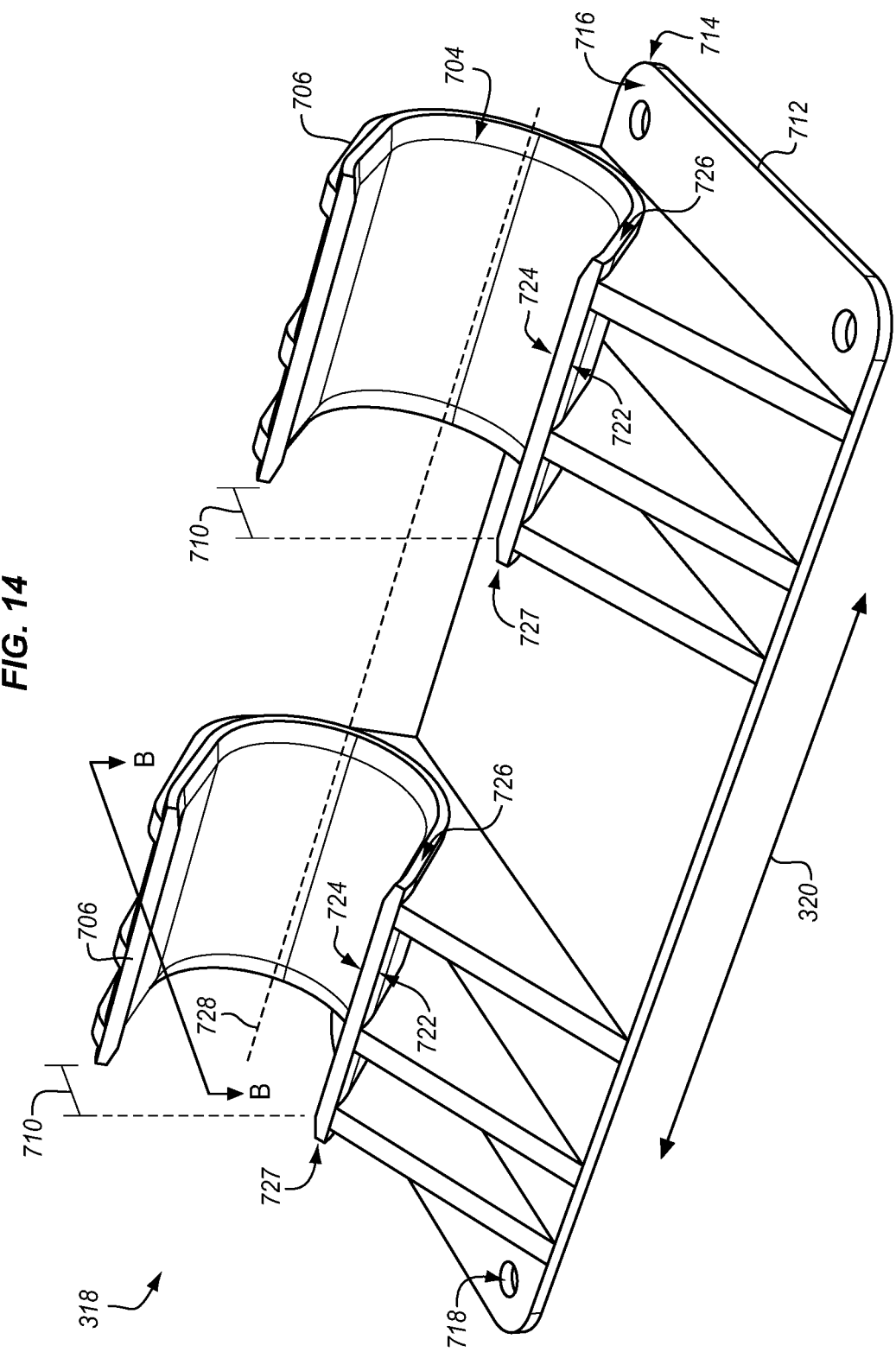
FIG. 14 is an isometric view of a first coupler of FIG. 13 in an illustrative embodiment.

FIG. 14 is an isometric view of first coupler 318 of FIG. 13 in an illustrative embodiment. First coupler 318 in FIG. 14 includes reference numbers previously described with respect to FIG. 8, so they will not be reiterated here.

Figure 15:
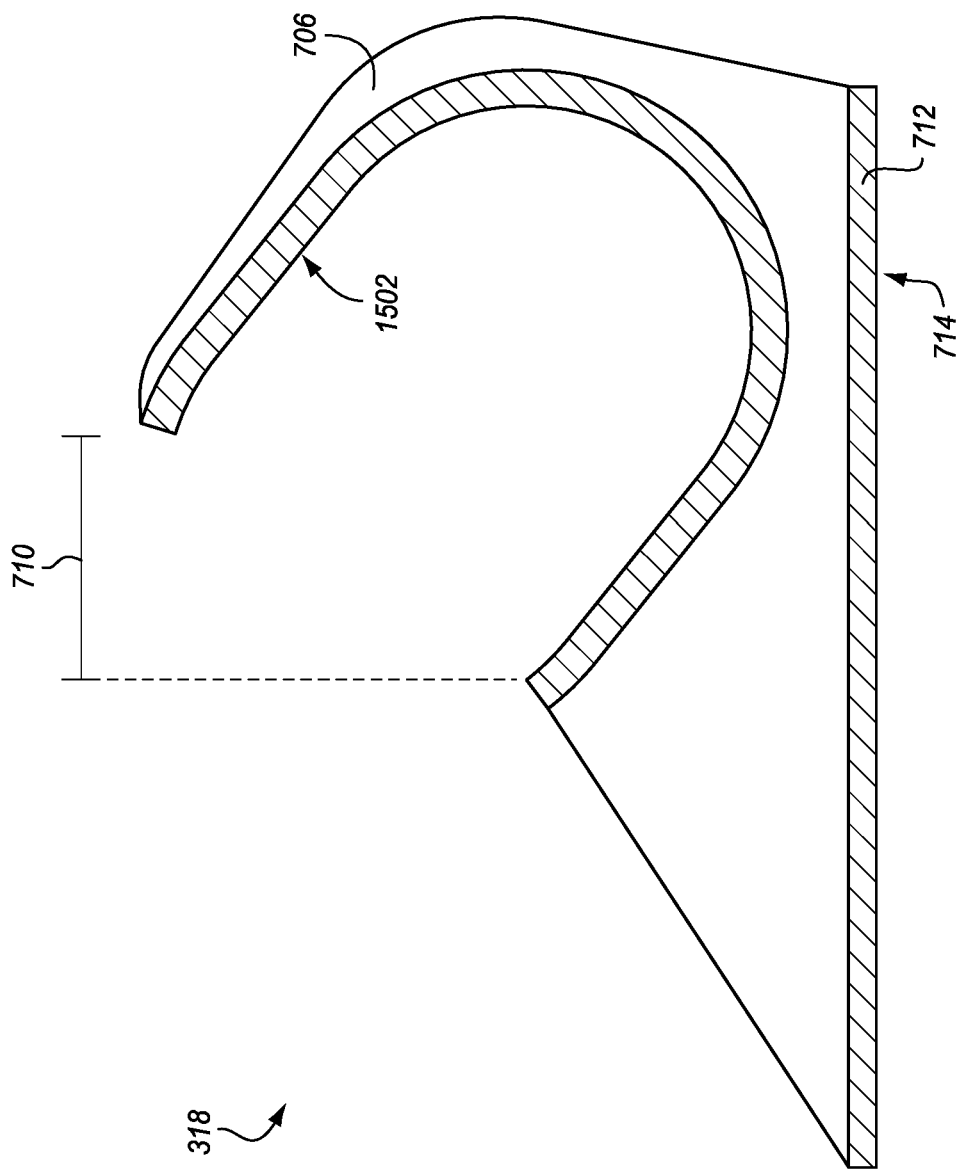
FIG. 15 is a cross-sectional view of the first coupler of FIG. 14 in an illustrative embodiment.

FIG. 15 is a cross-sectional view of first coupler 318 of FIG. 14 along cut lines B-B in an illustrative embodiment. In this embodiment, hollow channel 704 has a u-shaped cross-section 1502.

Figure 16:
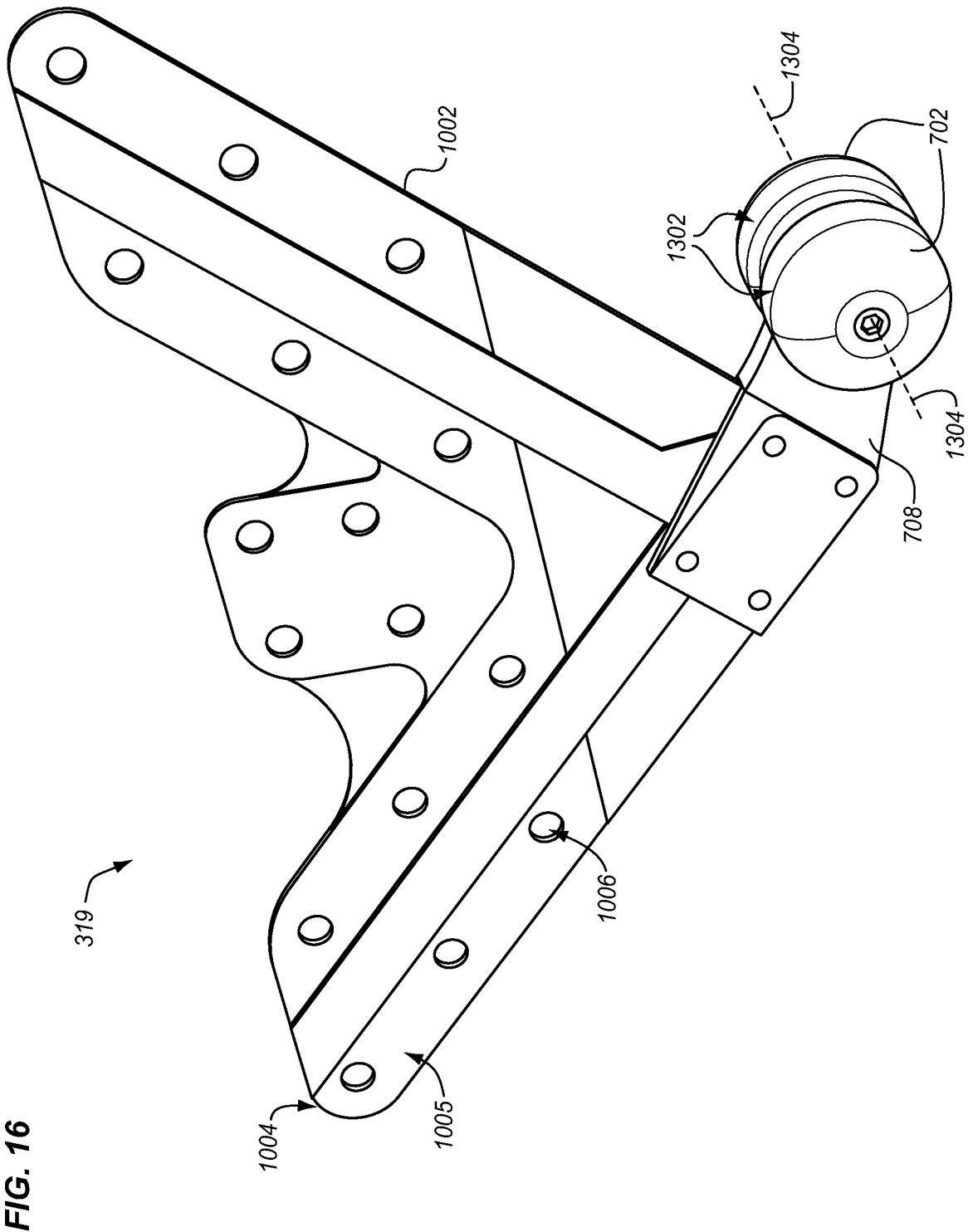
FIG. 16 is an isometric view of a second coupler of FIG. 13 in an illustrative embodiment.

FIG. 16 is an isometric view of second coupler 319 of FIG. 13 in an illustrative embodiment. Second coupler 319 in FIG. 16 includes reference numbers previously described with respect to FIG. 10, so they will not be reiterated here. In this embodiment, roller(s) 1302 have an axis of rotation 1304 that is transverse to arm 708 and second attachment member 1002.

Figure 17:
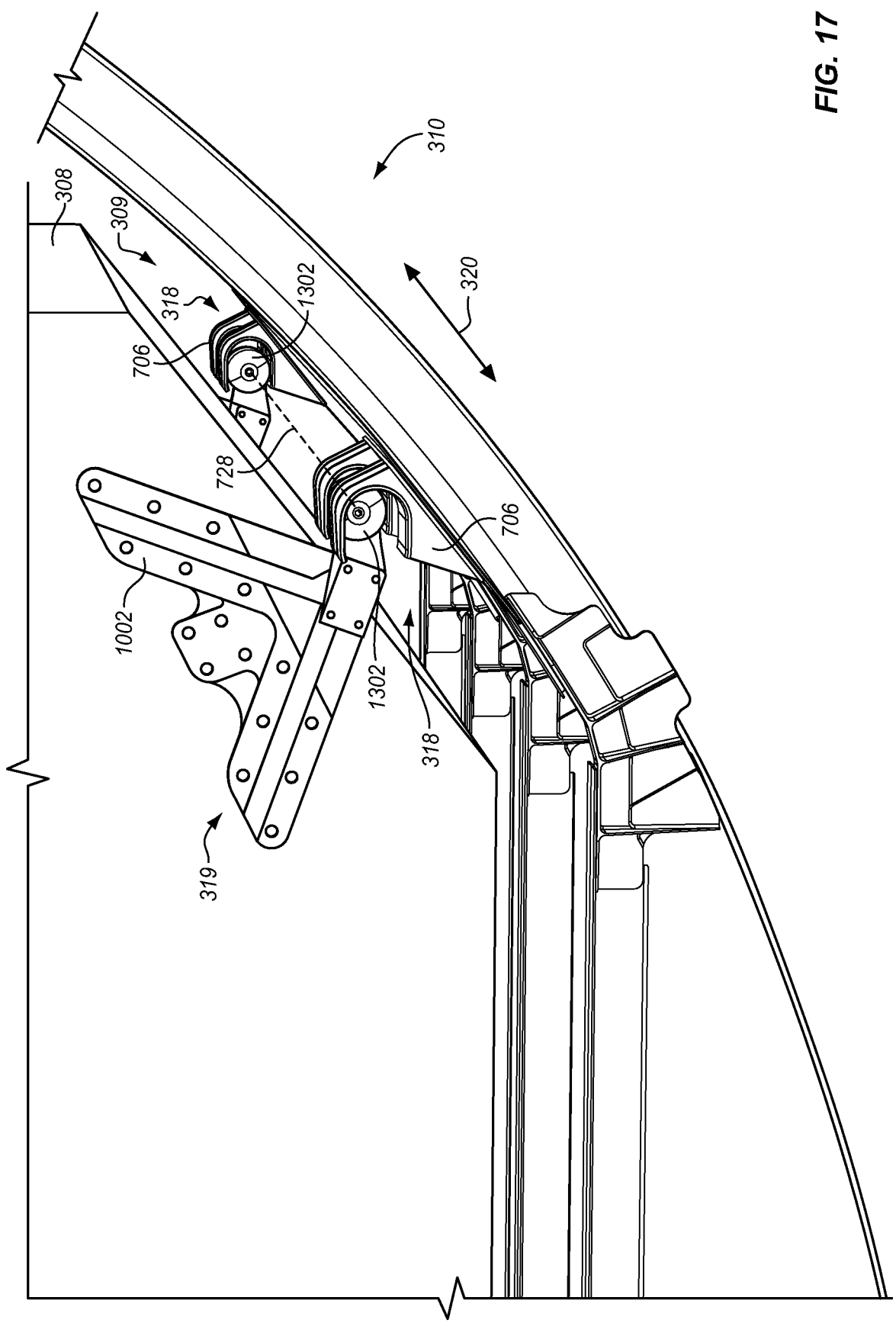
FIGS. 17-18 are isometric views of a side of the auxiliary fuel tank and the coupler assembly of FIG. 13 in an illustrative embodiment.
Figure 18:
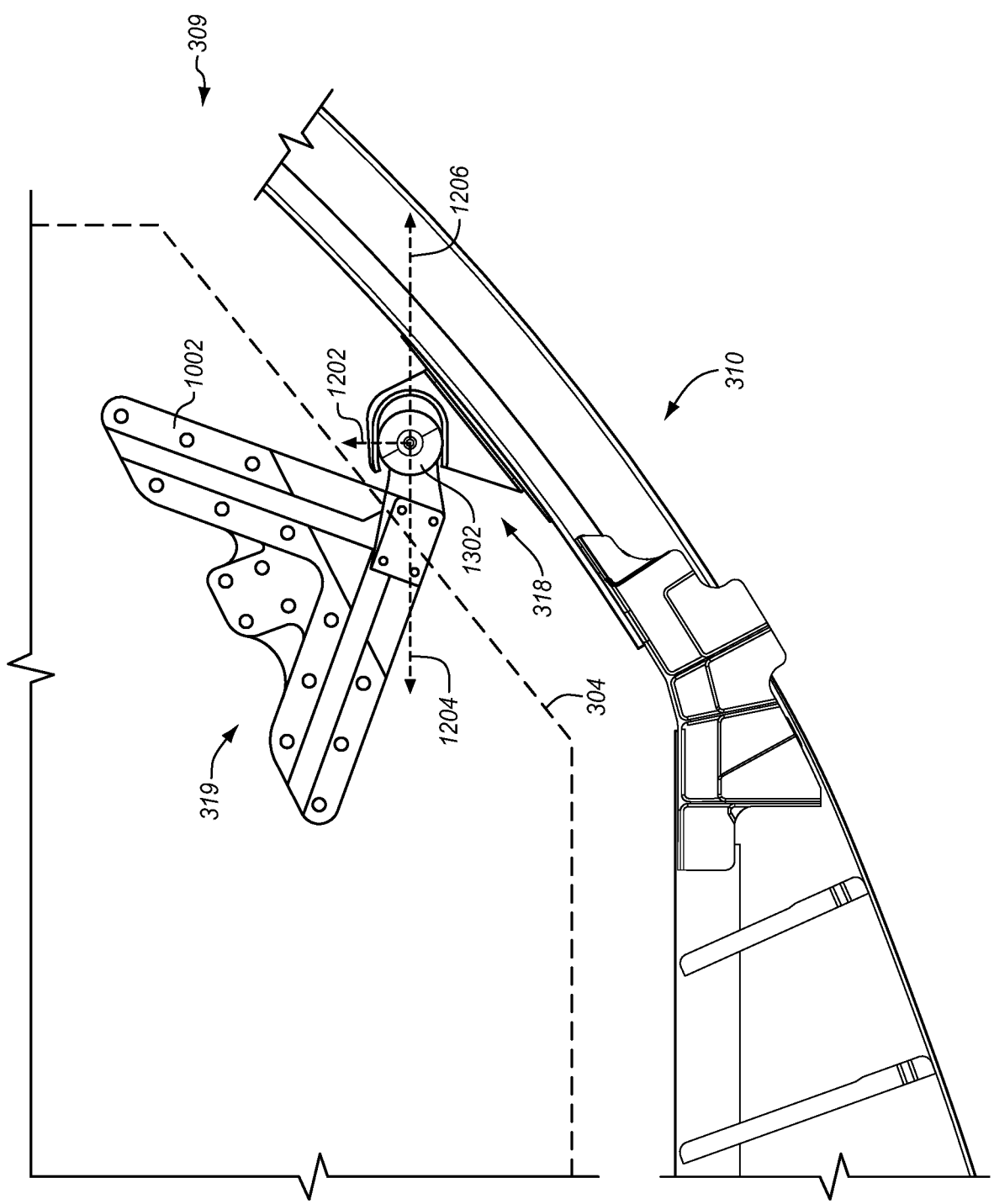

FIGS. 17-18 are isometric views of side 309 of auxiliary fuel tank 304 and coupler assembly 302 of FIG. 13 in an illustrative embodiment. FIG. 17 depicts that roller(s) 1302 are able to slide through hollow channels 704 of first couplers 318 as auxiliary fuel tank 304 moves longitudinally 320 through fuselage 310 (e.g., during installation and removal of auxiliary fuel tank 304 to positions either forward of the location shown in FIG. 17 or rearward of the location shown in FIG. 17).

In FIG. 18, the orientation of coupler assembly 302 at side 309 and the overall shape of roller(s) 1302 captured within hollow channel 704 prevents auxiliary fuel tank 304 from moving vertically in the direction of arrow 1202, while allowing movement between fuselage 310 and auxiliary fuel tank 304 in either inboard direction 1204 or outboard direction 1206 of fuselage 310. Although this embodiment of coupler assembly 302 does allow auxiliary fuel tank 304 to move longitudinally 320 (into and out of the page in FIG. 17), this movement is prevented after installation of auxiliary fuel tank 304 using stay rods or other mechanical restraints that secure auxiliary fuel tank 304 to fuselage 310. The result is that the configuration at side 309 of auxiliary fuel tank 304 depicted in FIG. 18 secures side 309 of fuel tank in a manner that allows for two degrees of movement between auxiliary fuel tank 304 and fuselage 310 (e.g., longitudinally 320, the inboard direction 1204, and the outboard direction 1206) prior to securing auxiliary fuel tank 304 in place after installation. Because auxiliary fuel tank 304 and fuselage 310 can move relative to each other in inboard direction 1204 and outboard direction 1206, flexing of fuselage 310 (e.g., during take-off and landing for the aircraft) does not impart structural loads onto auxiliary fuel tank 304, which may cause damage to auxiliary fuel tank 304.

Figure 19:
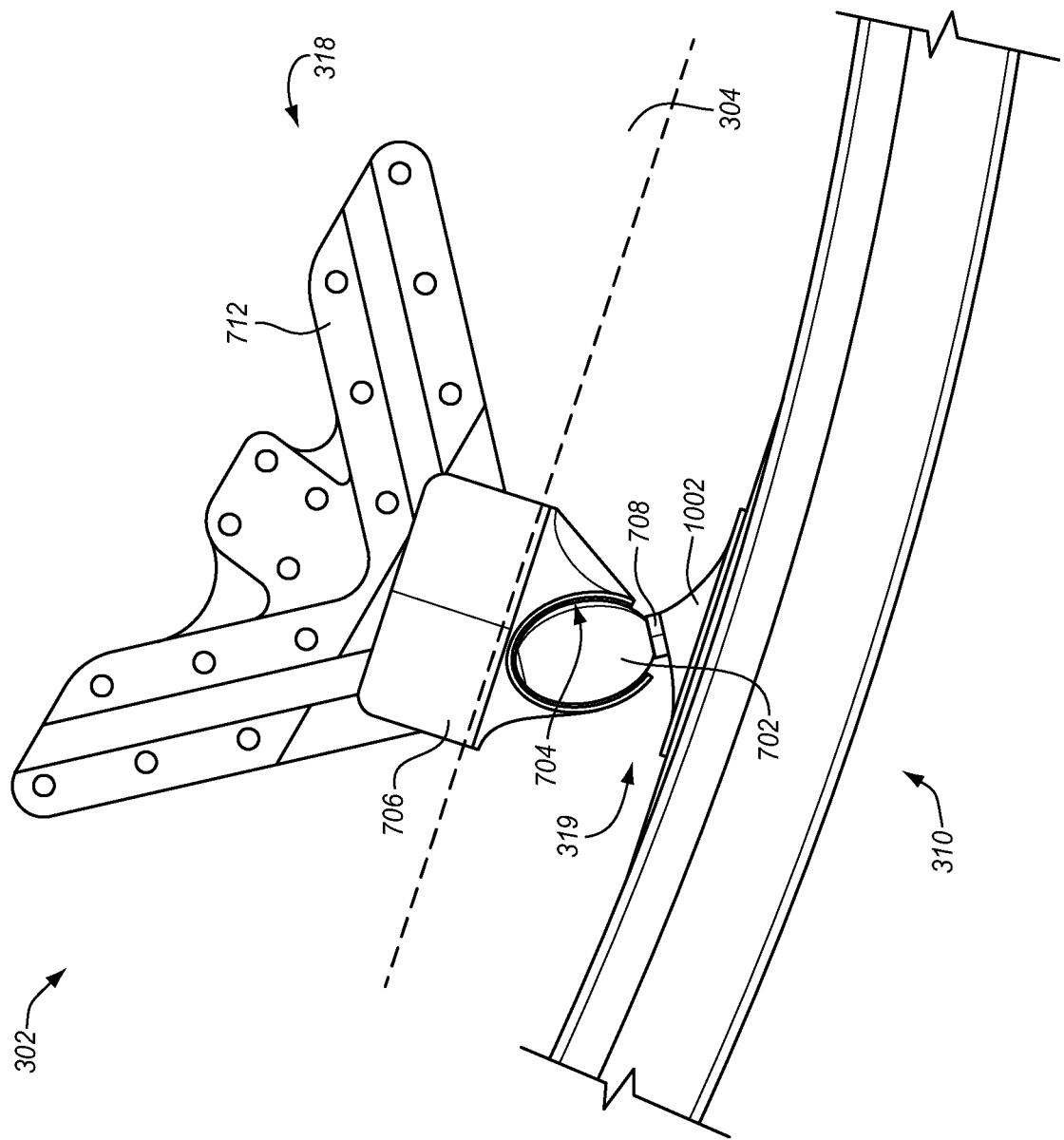
FIGS. 19-23 are isometric views of different coupler assemblies in illustrative embodiments.

FIGS. 19-23 are isometric views of different coupler assemblies 302 in illustrative embodiments. In FIG. 19, first coupler 318 is mounted to auxiliary fuel tank 304, and second coupler 319 is mounted to fuselage 310. In this embodiment, engagement member 702 is fixed relative to fuselage 310, and hollow channel is fixed relative to auxiliary fuel tank 304. Engagement member 702 slidably fits within hollow channel 704 of body 706. Generally, the embodiment depicted in FIG. 19 may be referred to as a first coupler assembly in some embodiments, which may be disposed on side 308 of auxiliary fuel tank 304 and operate similar to the configuration depicted in FIG. 7 to constrain side 308 of auxiliary fuel tank 304 to one degree of movement as described for FIG. 12.

Figure 20:
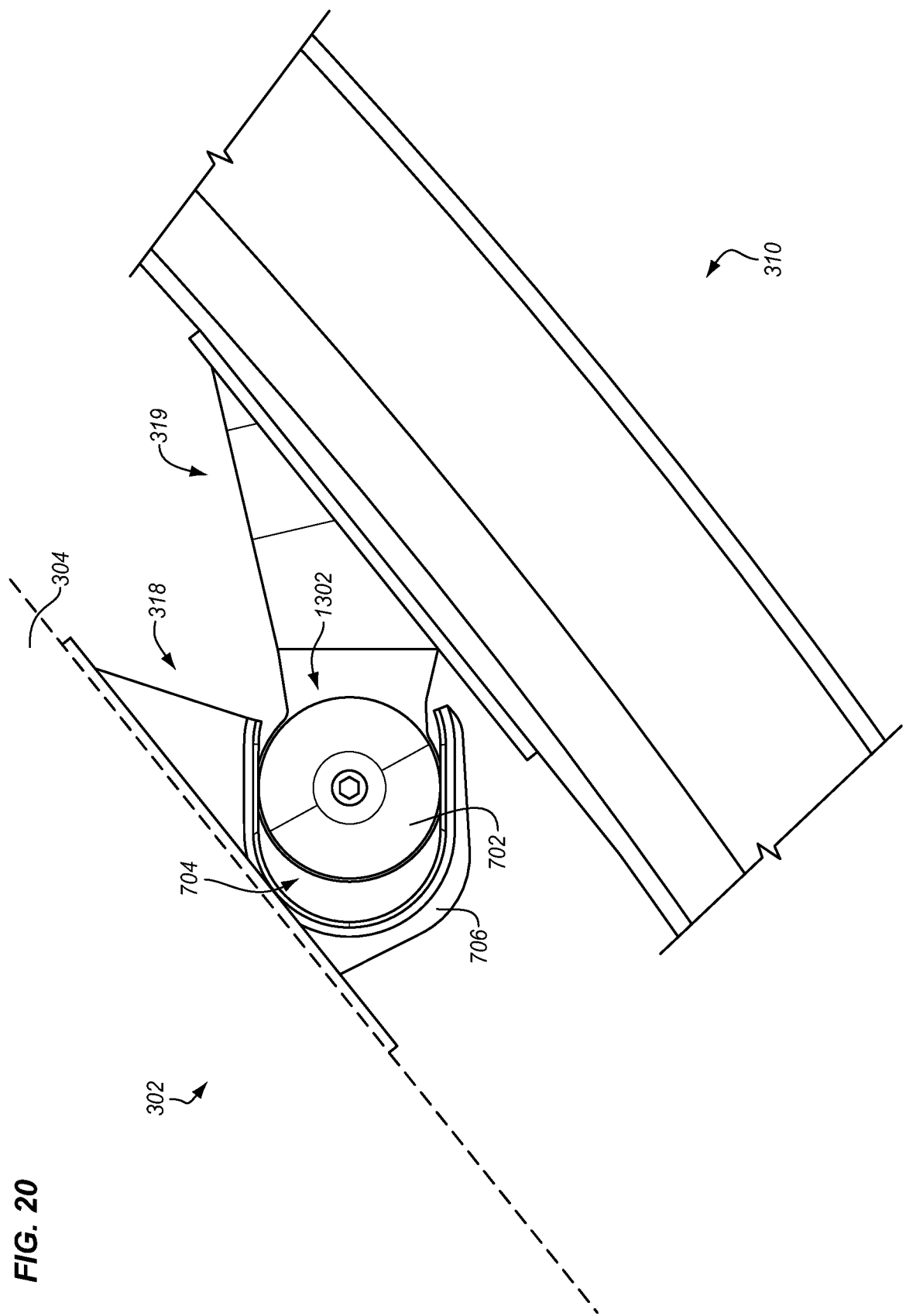

In FIG. 20, first coupler 318 is mounted to auxiliary fuel tank 304, and second coupler 319 is mounted to fuselage 310. In this embodiment, roller(s) 1302 are fixed relative to fuselage 310 and body 706 is fixed relative to auxiliary fuel tank 304. Roller(s) 1302 slidably fit within hollow channel 704 of body 706. Generally, the embodiment depicted in FIG. 20 may be referred to as a second coupler assembly in some embodiments, which may be disposed on side 309 of auxiliary fuel tank 304 and operate similar to the configuration depicted in FIG. 18 to constrain side 309 of auxiliary fuel tank 304 to two degrees of movement as described for FIG. 18.

Figure 21:
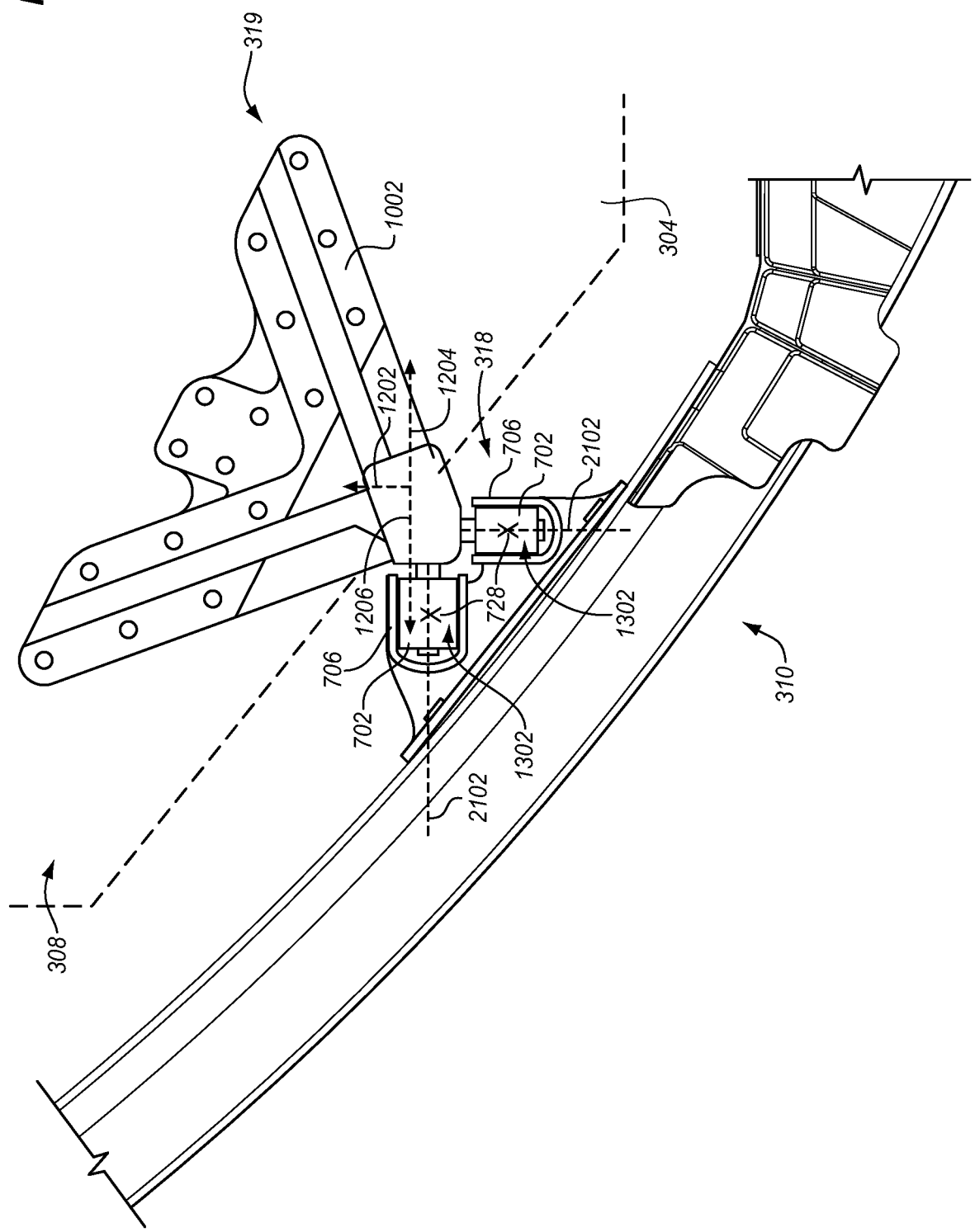

In FIG. 21, first coupler 318 is mounted to fuselage 310 and second coupler 319 is mounted to auxiliary fuel tank 304. In this embodiment, engagement member 702 comprises two rollers 1302, each having an axis of rotation 2102 that is perpendicular to centerline 728 of hollow channels 704 (centerline 728 is into and out of the page in FIG. 21). Generally, the embodiment depicted in FIG. 219 may be referred to as a first coupler assembly in some embodiments, which may be disposed on side 308 of auxiliary fuel tank 304 and operate similar to the configuration depicted in FIG. 7 to constrain side 308 of auxiliary fuel tank 304 to one degree of movement as described for FIG. 12. Similar to the embodiments previously described, rollers 1302 and body 706 may swap positions, with body 706 attached to auxiliary fuel tank 304 and rollers 1302 attached to fuselage 310.

Figure 22:
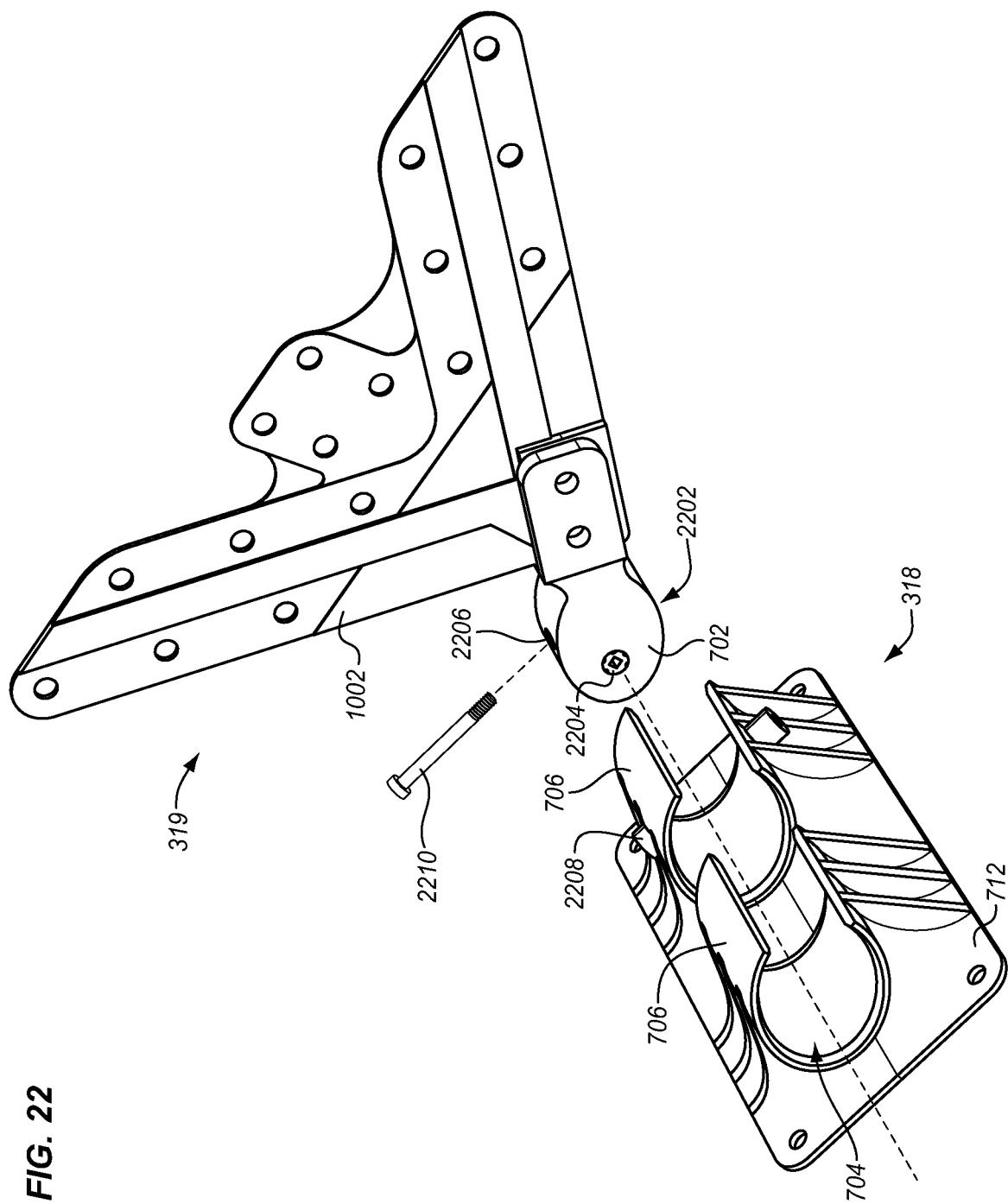

In some embodiments, a bolt may be used to secure engagement member 702 within hollow channel 704. In FIG. 22, engagement member 702, which has an outer surface 2202 in a shape of an ellipse to correspond with hollow channel 704 of FIG. 9, may include an adjustment feature 2204 that modifies an alignment between a threaded fitting 2206 on engagement member 702 and a hole 2208 that extends through body 706 of first coupler 318. In FIG. 22, a bolt 2210 threads into threaded fitting 2206 of engagement member 702, and a rotation of adjustment feature 2204 on engagement member 702 modifies an offset of threaded fitting 2206 relative to engagement member 702, which allows bolt 2210 to be aligned with hole 2208 through body 706. Similar to the embodiments previously described, engagement member 702 and body 706 may swap positions, with body 706 attached to and fixed relative to auxiliary fuel tank 304 and engagement member attached to and fixed relative to fuselage 310.

Figure 23:
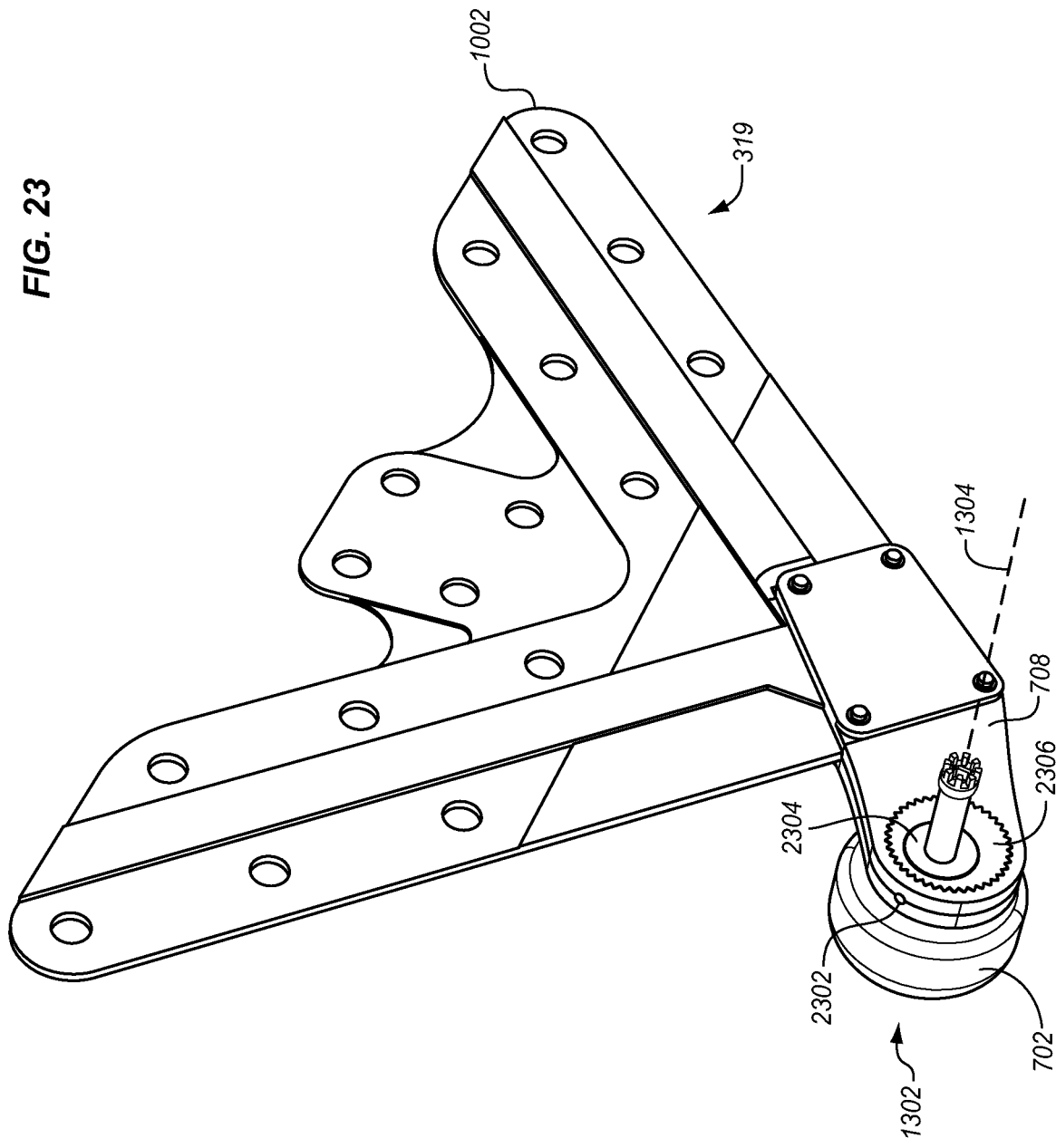

Due to the imperfect nature of vertical and/or horizontal alignment between the first coupler 318 and second coupler 319 as auxiliary fuel tank 304 is installed or removed from fuselage 310, engagement members 702 may include an adjustment feature that modifies their position relative to arm 708. In FIG. 23, the position of roller 1302 (one is removed in this view) is adjustable with respect to arm 708 using an adjustment screw 2302, which modifies the relationship between a spherical bearing 2304 within an eccentric casing 2306 and modifies the vertical and/or horizontal position of axis of rotation 1304 with respect to arm 708. Similar to the embodiments previously described, roller 1302 and body 706 (not shown in this view) may swap positions, with body 706 attached to and fixed relative to auxiliary fuel tank 304 and roller 1302 attached to and fixed relative to fuselage 310.

Figure 24:
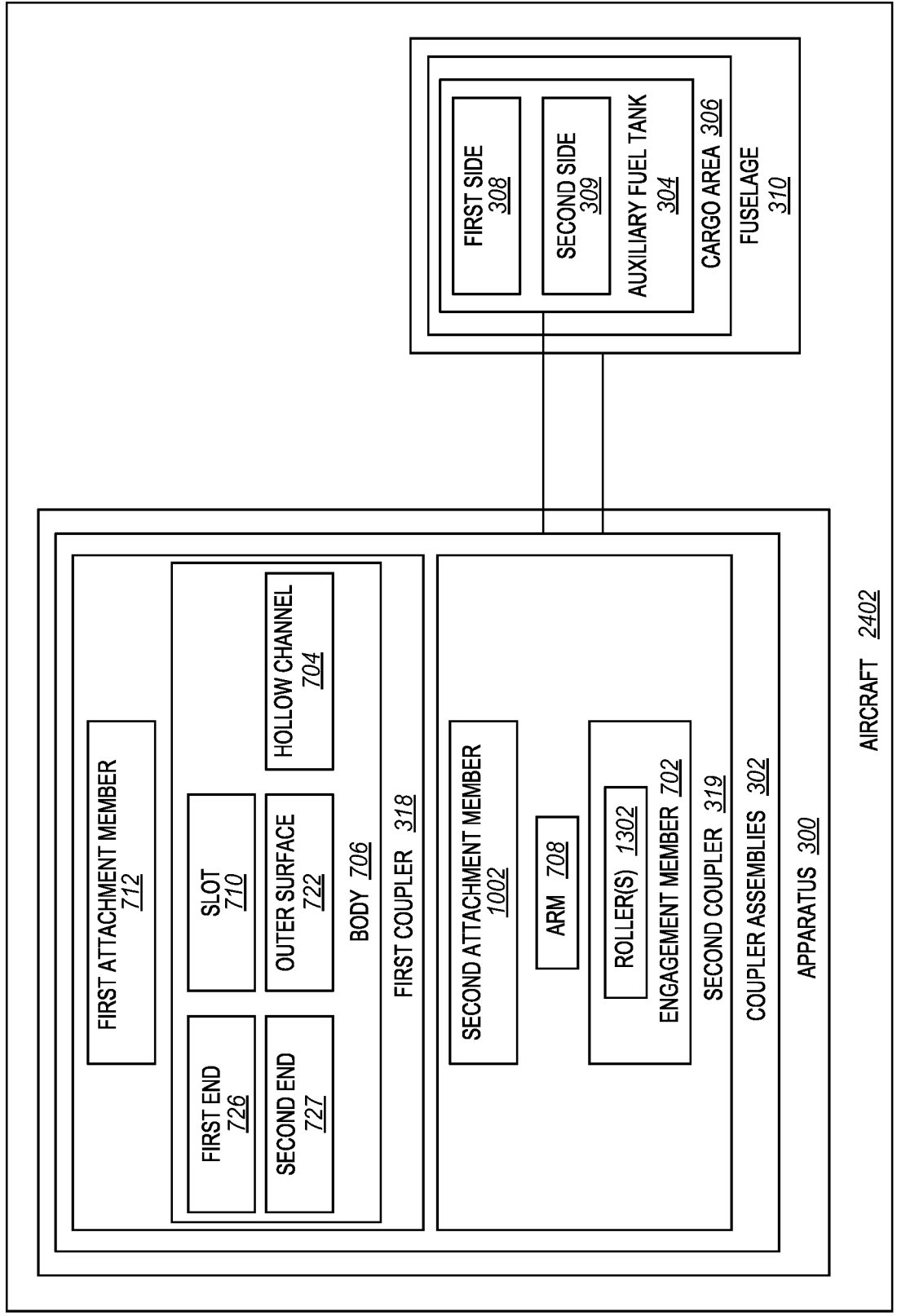
FIG. 24 is a block diagram of an aircraft in an illustrative embodiment.

FIG. 24 is a block diagram of an aircraft 2402 that utilizes apparatus 300 for removably securing auxiliary fuel tank 304 to fuselage 310 of an aircraft 2402 in an illustrative embodiment. In this embodiment, coupler assemblies 302 of apparatus 300 include any component, system, or device that removably secure auxiliary fuel tank 304 to fuselage 310. Coupler assemblies 302 include first coupler 318 having first attachment member 712 and body 706. First attachment member 712 comprises any component, system, or device that mounts to fuselage 310 and/or auxiliary fuel tank 304 and supports body 706. Hollow channel 704 of body 706 extends between first end 726 and second end 727 of body 706, and may have any defined interior shape as a matter of design choice. Coupler assemblies 302 further include second coupler 319 having second attachment member 1002, arm 708, and engagement member 702. Second attachment member 1002 comprises any component, system, or device that mounts to fuselage 310 and/or auxiliary fuel tank 304, and supports arm 708 and engagement member 702. Engagement member 702 may comprise any shape as desired that slidably fits and engages within hollow channel 704 of body 706 such that first coupler 318 and second coupler 319 are secured from moving with respect to each other in two degrees of movement or less in directions that are transverse to the fore and aft directions in fuselage 310.

Figure 25:
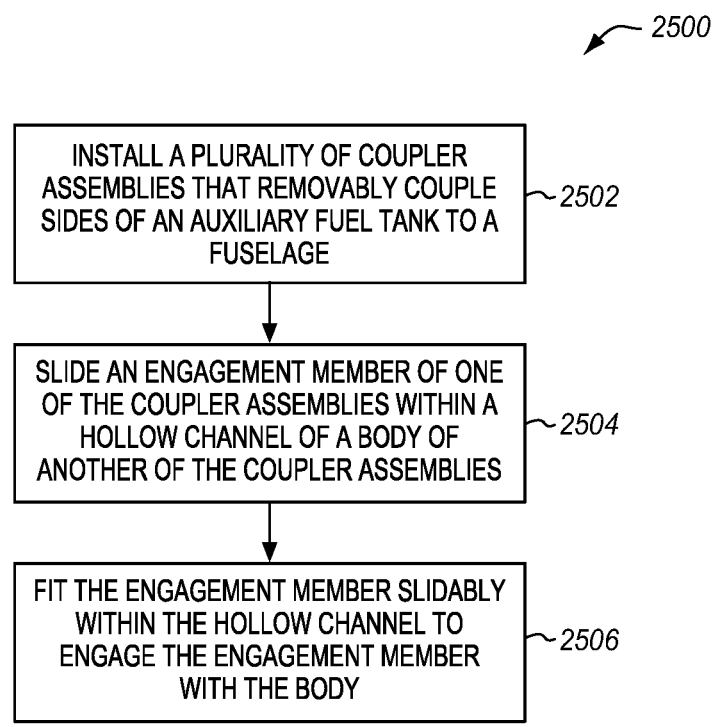
FIG. 25 is a flow chart of a method for removably securing an auxiliary fuel tank in cargo area of aircraft in an illustrative embodiment.
Figure 26:
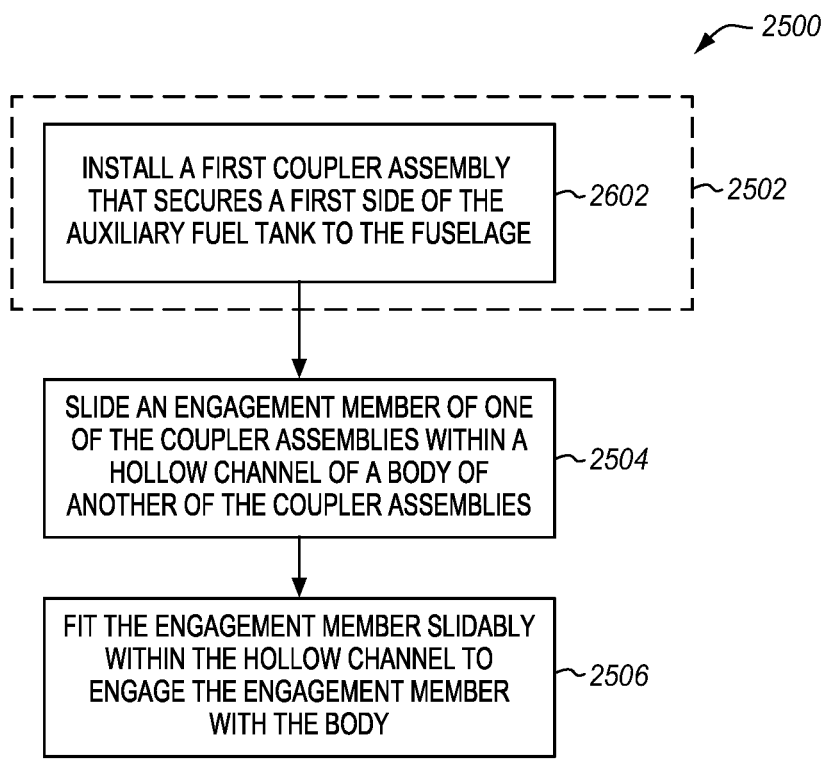
FIGS. 26-27 depict optional steps of the method of FIG. 25 in an illustrative embodiment.
Figure 27:
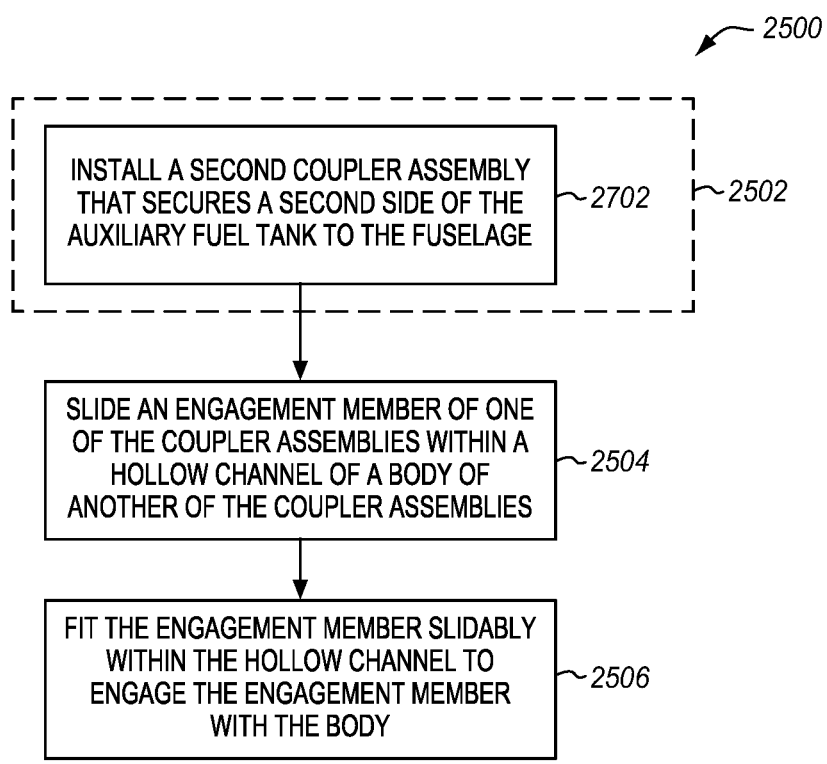

FIG. 25 is a flow chart of a method 2500 for removably securing an auxiliary fuel tank in a cargo area of an aircraft in an illustrative embodiment, FIGS. 26-27 depict optional steps of method 2500, and FIGS. 28-31 are isometric views of coupler assemblies 302, auxiliary fuel tank 304, and fuselage 310 during performance of method 2500 in illustrative embodiments.

Method 2500 will be discussed with respect to apparatus 300 and aircraft 2402, although method 2500 may apply to other embodiments not shown or described. The steps of method 2500 are not all inclusive, and may include other steps, not shown. Further, the steps may be performed in an alternate order.

Figure 28:
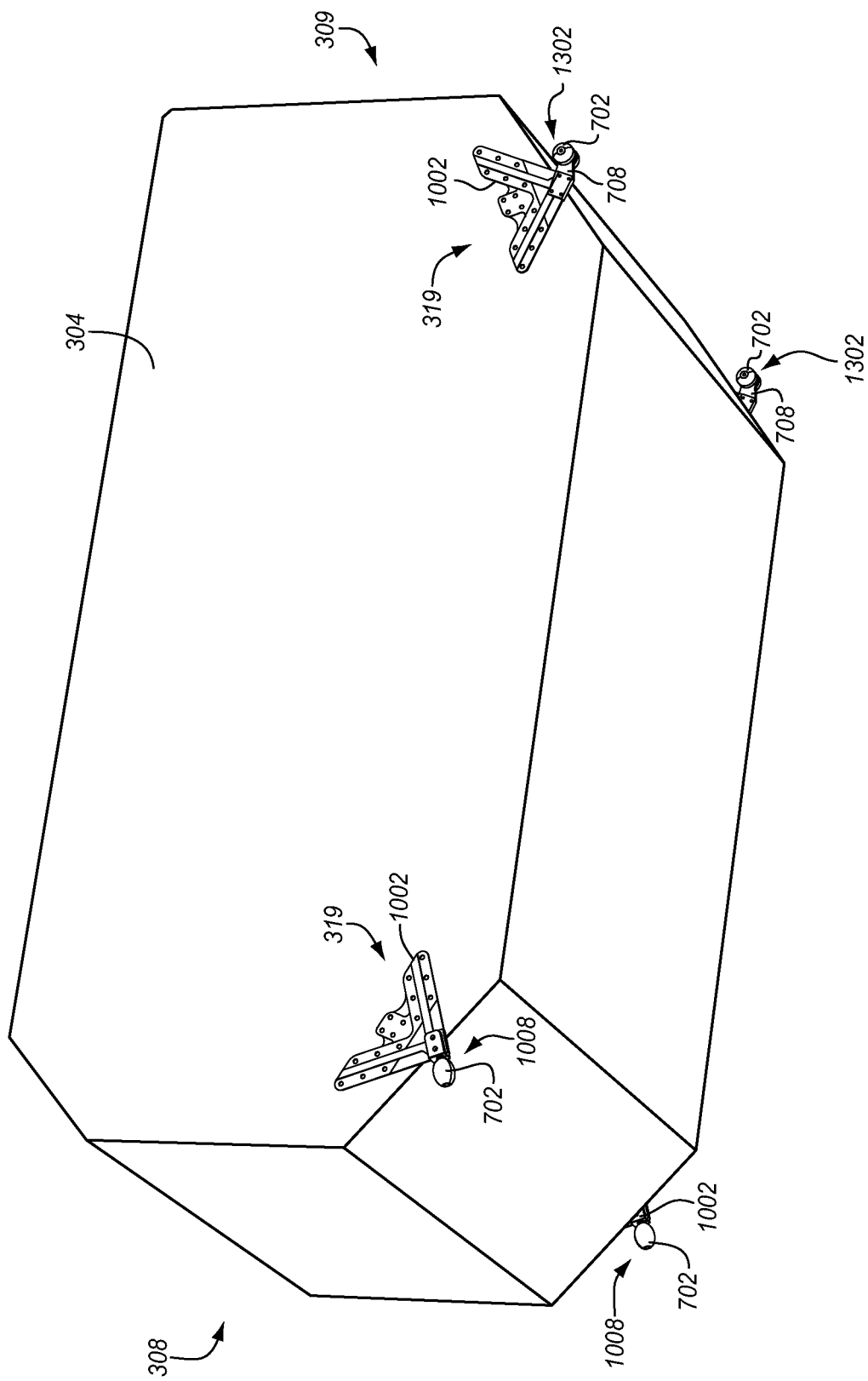
FIGS. 28-31 are isometric views of the coupler assemblies, the auxiliary fuel tank, and the fuselage of an aircraft during various steps of the method of FIG. 25.

Step 2502 comprises installing coupler assemblies 302 to sides 308-309 of auxiliary fuel tank 304 and to fuselage 310. In FIG. 28, second couplers 319 are installed on auxiliary fuel tank 304, although first couplers 318 may be installed on auxiliary fuel tank 304 in other embodiments. Further, engagement members 702 on side 308 have an elliptical shape 1008 and engagement members 702 on side 309 are rollers 1302, but engagement members 702 on side 308 and/or side 309 may be different in other embodiments.

Figure 29:
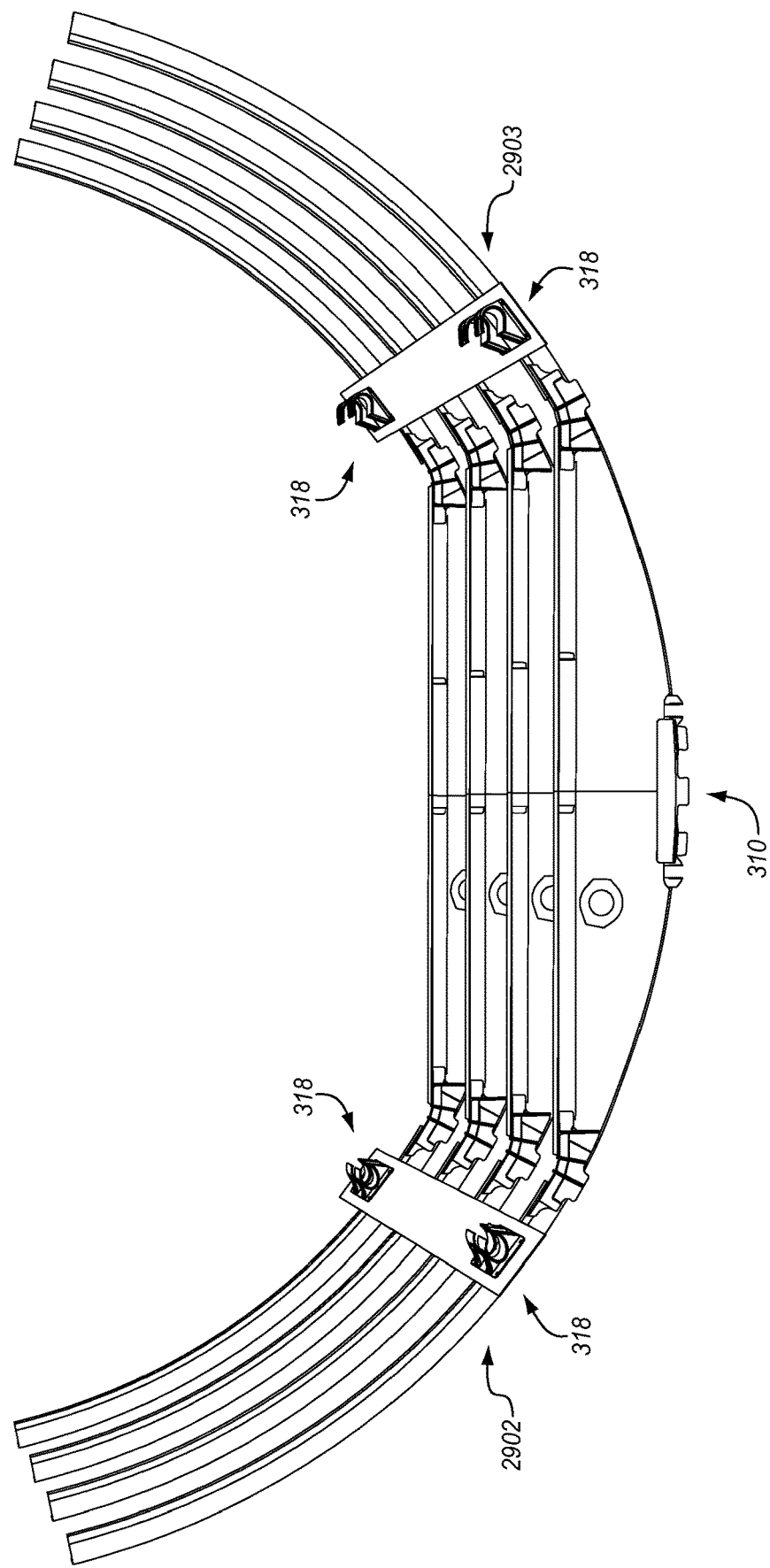

In FIG. 29, first couplers 318 are installed to fuselage 310, although second couplers 319 may be installed to fuselage 310 in other embodiments. Further, hollow channels 704 of first couplers 318 on side 2902 of fuselage 310 have an elliptical cross-section 902 (see FIG. 9) and hollow channels 704 of first couplers 318 on side 2903 of fuselage 310 have u-shaped cross-section 1502 (see FIG. 15), but hollow channels 704 on side 2902 and/or side 2903 may have different cross-sections other embodiments.

Figure 30:
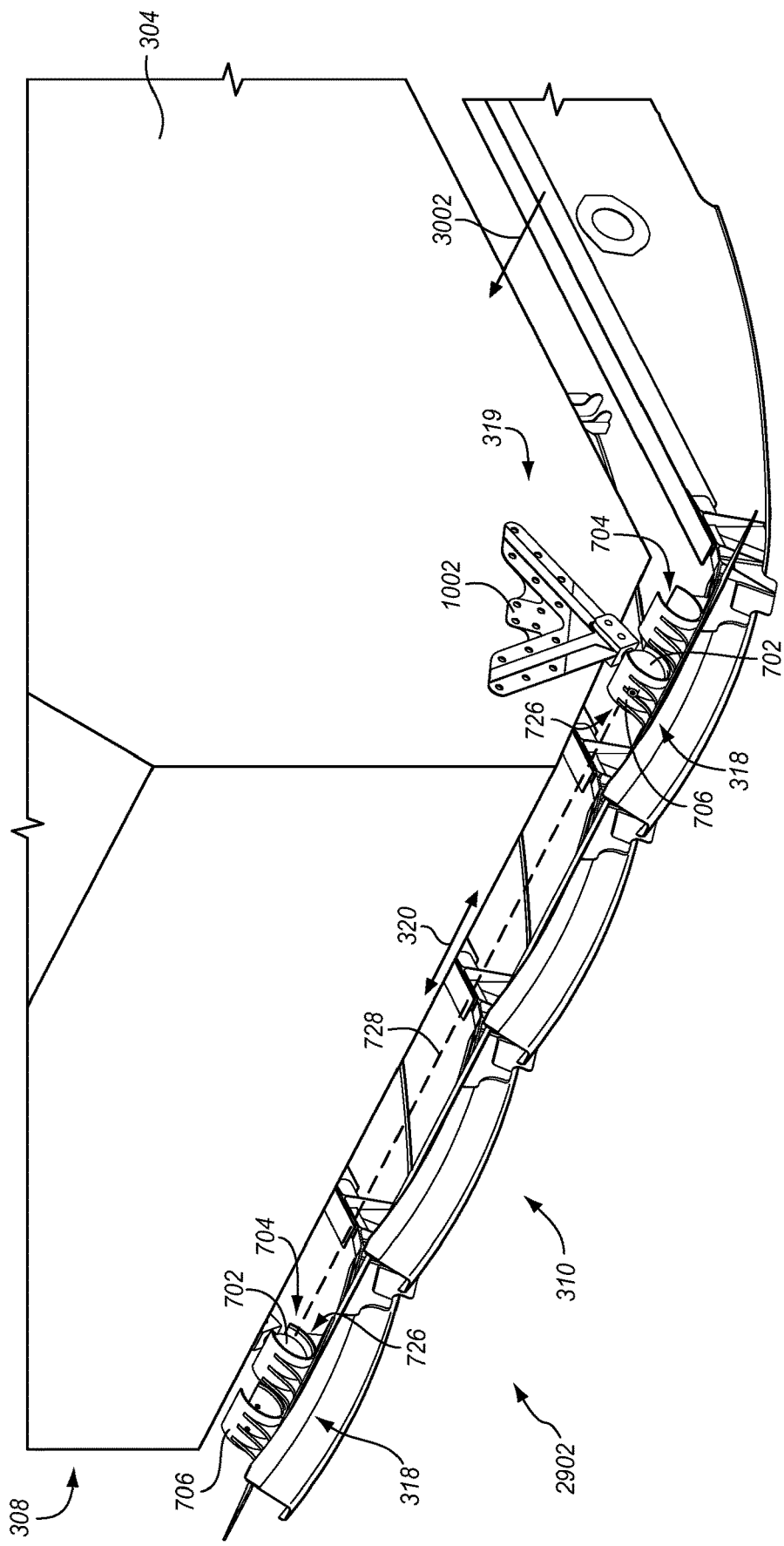
Figure 31:
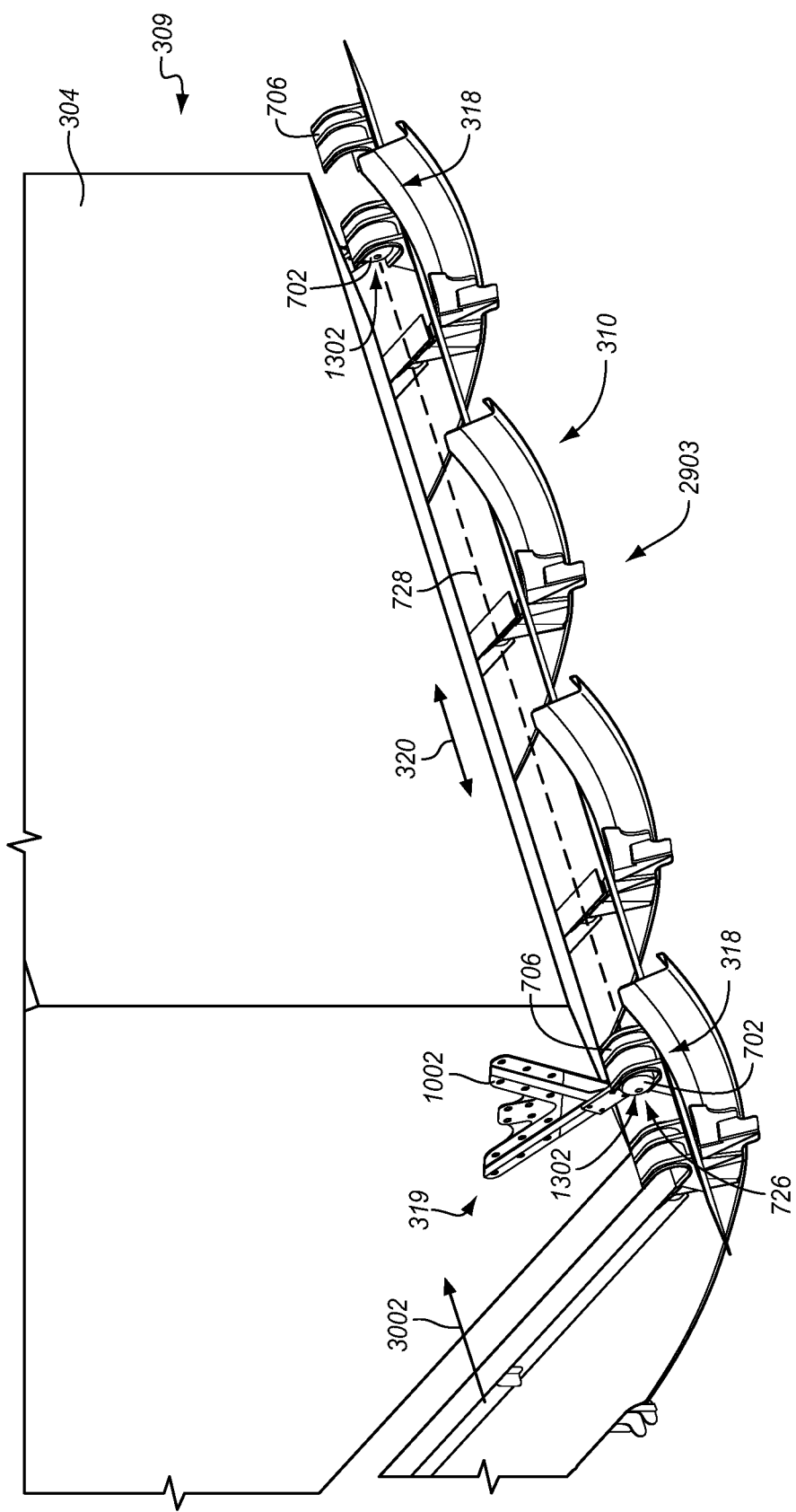

Step 2504 comprises sliding engagement member 702 within hollow channel 704 from first end 726 of body 706. In FIGS. 30-31, engagement member 702 enters hollow channel 704 at first end 726 of body 706 as auxiliary fuel tank 304 moves in the direction of arrow 3002 longitudinally 320 in fuselage 310. Step 2506 comprises engaging engagement member 702 within hollow channel 704 of body 706 of first coupler 318. If auxiliary fuel tank 304 is in its final position in fuselage 310, stay rods or other securing devices may be used to secure auxiliary fuel tank 304 in place. However, if the final position of auxiliary fuel tank 304 is at a different final position, then auxiliary fuel tank 304 may continue to be moved in the direction of arrow 3002 longitudinally 320 in fuselage 310.

In some embodiments, sides 308-309 of auxiliary fuel tank 304 may be secured to different degrees of freedom of movement between auxiliary fuel tank 304 and fuselage 310, to prevent flexing of fuselage 310 from generating structural loads on auxiliary fuel tank 304. For example, side 308 of auxiliary fuel tank 304 may be secured using the configuration of coupler assembly 302 depicted in FIG. 7, which secures side 308 of auxiliary fuel tank 304 as described and shown for FIG. 12 (see step 2602 of FIG. 26). In another example, side 309 of auxiliary fuel tank 304 may be secured using the configuration of coupler assembly 302 depicted in FIG. 13, which secures side 309 of auxiliary fuel tank 304 as described and shown for FIG. 15 (see step 2702 of FIG. 27).

Although method 2500 has been described with respect to specific configurations of coupler assemblies 302, method 2500 applies equally to other configurations of coupler assemblies 302, including, but not limited to, configurations specifically depicted in the drawings and their variations.

Because coupler assemblies 302 are transparent longitudinally 320 when couplers mounted to auxiliary fuel tank 304 are engaged with couplers mounted to fuselage 310, auxiliary fuel tank 304 can be moved through fuselage 310 past different attachment points for other fuel tanks without vertically translating auxiliary fuel tank 304 during the process. Without a vertical translation, auxiliary fuel tank 304 can be made taller, allowing it to hold more fuel.

Figure 32:
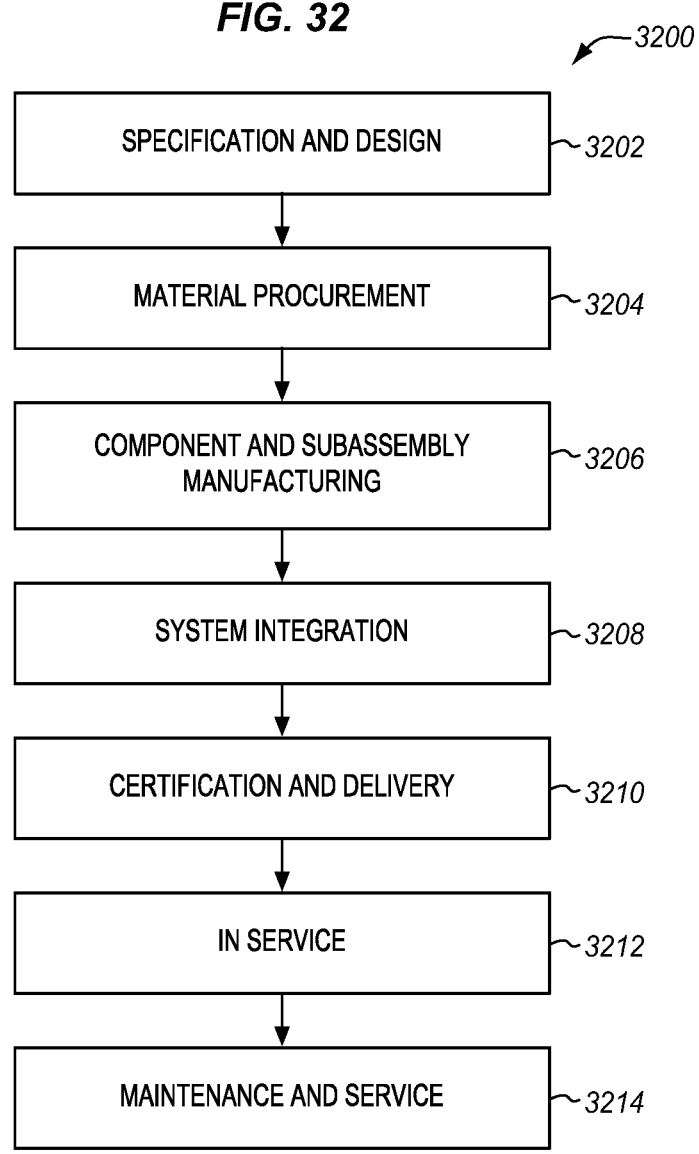
FIG. 32 is a flow chart illustrating an aircraft manufacturing and service method in an illustrative embodiment.
Figure 33:
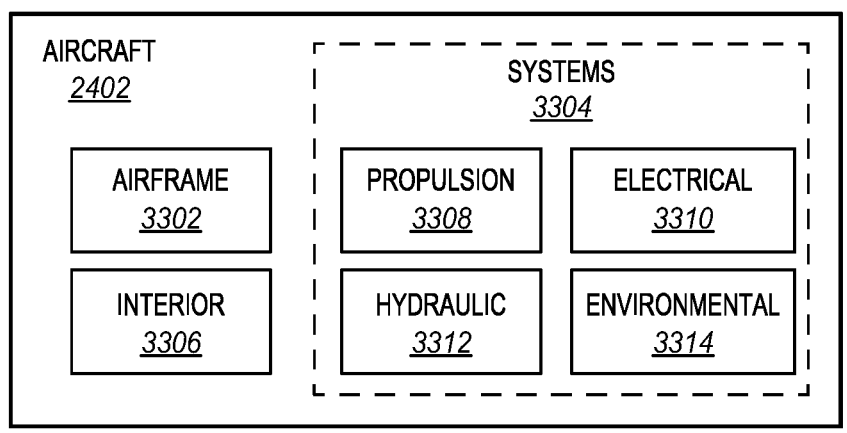
FIG. 33 is a schematic diagram of an aircraft in an illustrative embodiment.

The embodiments of the disclosure may be described in the context of an aircraft manufacturing and service method 3200 as shown in FIG. 32 and aircraft 2402 as shown in FIG. 33. During pre-production, exemplary method 3200 may include a specification and design 3202 of aircraft 2402, and material procurement 3204. During production, component and subassembly manufacturing 3206 and system integration 3208 of aircraft 2402 takes place. Thereafter, aircraft 2402 may go through certification and delivery 3210 in order to be placed in service 3212. While in service by a customer, aircraft 2402 is scheduled for routine maintenance and service 3214 (which may also include modification, reconfiguration, refurbishment, and so on).

Each of the processes of method 3200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 33, aircraft 2402 produced by exemplary method 3200 may include an airframe 3302 with a plurality of systems 3304 and an interior 3306. Examples of systems 3304 include one or more of propulsion systems 3308, an electrical system 3310, a hydraulic system 3312, and an environmental system 3314. Any number of other systems may be included. Although an aerospace example is shown, the principles described in this specification may be applied to other industries, such as the automotive industry.

Apparatus and methods embodied herein may be employed during any one or more of the stages of the production and service method 3200. For example, components or subassemblies corresponding to process 3206 may be fabricated or manufactured in a manner similar to components or subassemblies produced while aircraft 2402 is in service. Also, one or more apparatus embodiments, method embodiments, or a combination thereof may be utilized during the component subassembly and manufacturing 3206 and system integration 3208, for example, by substantially expediting assembly of or reducing the cost of aircraft 2402. Similarly, one or more of apparatus embodiments, method embodiments, or a combination thereof may be utilized while aircraft 2402 is in service, for example and without limitation, to maintenance and service 3214.

Although specific embodiments were described herein, the scope is not limited to those specific embodiments. Rather, the scope is defined by the following claims and any equivalents thereof.

What is claimed is:

1. An apparatus for removably securing an auxiliary fuel tank in a cargo area of an aircraft, the apparatus comprising:
   four or more coupler assemblies that removably couple sides of the auxiliary fuel tank to a fuselage of the aircraft, wherein at least two coupler assemblies of the four or more coupler assemblies are disposed on each of two sides of the auxiliary fuel tank;
   wherein each of the coupler assemblies comprises:
      a first coupler that includes a first attachment member that supports a body with a hollow channel having a centerline disposed longitudinally in the fuselage between a first end and a second end, and a slot between an outer surface of the body and the hollow channel; and
      a second coupler that includes an engagement member, a second attachment member, and an arm extending between the engagement member and the second attachment member,
      wherein the engagement member is slidably received within the hollow channel from the first end,
      wherein a position of the engagement member is modifiable relative to the arm, and
      wherein the engagement member fits slidably within the hollow channel to engage with the body of the first coupler, and the arm extends through the slot.

2. The apparatus of claim 1, wherein:
   the hollow channel has an elliptical cross-section between the first end and the second end, and
   the engagement member has an elliptical shape to fit slidably within the hollow channel.

3. The apparatus of claim 1, wherein:
   the hollow channel has a u-shaped cross-section between the first end and the second end, and
   the engagement member comprises a roller that fits slidably within the hollow channel.

4. The apparatus of claim 3, wherein:
   the roller has an axis of rotation perpendicular to the centerline of the hollow channel.

5. The apparatus of claim 3, wherein:
   the roller has an axis of rotation parallel to the centerline of the hollow channel, and
   the slot between the outer surface of the body and the hollow channel opens towards one of an inboard direction and an outboard direction of the fuselage.

6. The apparatus of claim 1, wherein:
   each of the coupler assemblies include a first coupler assembly that secures a first side of the auxiliary fuel tank in a manner that allows for a single degree of movement between the auxiliary fuel tank and the fuselage,
   the hollow channel of the first coupler assembly has an elliptical cross-section between the first end and the second end, and
   the engagement member of the first coupler assembly has an elliptical shape to fit slidably within the hollow channel.

7. The apparatus of claim 6, wherein:
   each of the coupler assemblies include a second coupler assembly that secures a second side of the auxiliary fuel tank in a manner that allows for two degrees of movement between the auxiliary fuel tank and the fuselage,
   the hollow channel of the second coupler assembly has a u-shaped cross-section between the first end and the second end,
   the engagement member of the second coupler assembly comprises a roller that fits slidably within the hollow channel with an axis of rotation parallel to the centerline of the hollow channel, and
   the slot between the outer surface of the body and the hollow channel of the second coupler assembly opens towards one of an inboard direction and an outboard direction of the fuselage.

8. The apparatus of claim 7, wherein:
   the roller includes a spherical bearing with an eccentric casing that modifies a position of the axis of rotation relative to the arm.

9. A method for removably securing an auxiliary fuel tank in a cargo area of an aircraft, the method comprising:
   installing four or more coupler assemblies that removably couples sides of the auxiliary fuel tank to a fuselage of the aircraft, wherein at least two coupler assemblies of the four or more coupler assemblies are disposed on each of two sides of the auxiliary fuel tank, wherein each of the coupler assemblies comprises a first coupler that includes a first attachment member that supports a body with a hollow channel having a centerline disposed longitudinally in the fuselage between a first end and a second end, and a slot between an outer surface of the body and the hollow channel, and a second coupler that includes an engagement member, a second attachment member, and an arm extending between the engagement member and the second attachment member;
   modifying a position of the engagement member relative to the arm;
   sliding the engagement member within the hollow channel from the first end; and
   engaging the engagement member within the hollow channel of the body of the first coupler, with the arm extending through the slot.

10. The method of claim 9, wherein:
   the hollow channel has an elliptical cross-section between the first end and the second end, and
   the engagement member has an elliptical shape to fit slidably within the hollow channel.

11. The method of claim 9, wherein:
   the hollow channel has a u-shaped cross-section between the first end and the second end, and
   the engagement member comprises a roller that fits slidably within the hollow channel.

12. The method of claim 11, wherein:
   the roller has an axis of rotation perpendicular to the centerline of the hollow channel.

13. The method of claim 11, wherein:
   the roller has an axis of rotation parallel to the centerline of the hollow channel, and
   the slot between the outer surface of the body and the hollow channel opens towards one of an inboard direction and an outboard direction of the fuselage.

14. The method of claim 9, wherein:
   installing the four or more coupler assemblies further comprises:
      installing a first coupler assembly that secures a first side of the auxiliary fuel tank in a manner that allows for a single degree of movement between the auxiliary fuel tank and the fuselage,
      wherein the hollow channel of the first coupler assembly has an elliptical cross-section between the first end and the second end, and
      wherein the engagement member has an elliptical shape to fit slidably within the hollow channel.

15. The method of claim 14, wherein:
installing the four or more coupler assemblies further comprises:
- installing a second coupler assembly that secures a second side of the auxiliary fuel tank in a manner that allows for two degrees of movement between the auxiliary fuel tank and the fuselage,
- wherein the hollow channel of the second coupler assembly has a u-shaped cross-section between the first end and the second end,
- wherein the engagement member of the second coupler assembly comprises a roller that fits slidably within the hollow channel with an axis of rotation parallel to the centerline of the hollow channel, and
- wherein the slot between the outer surface of the body and the hollow channel of the second coupler assembly opens towards one of an inboard direction and an outboard direction of the fuselage.

16. The method of claim 15, wherein:
the roller includes a spherical bearing with an eccentric casing for modifying a position of the axis of rotation relative to the arm.

17. An aircraft, comprising:
a fuselage;
an auxiliary fuel tank;
two or more first coupler assemblies that removably secures a first side of the auxiliary fuel tank to the fuselage in a manner that allows for a single degree of movement between the auxiliary fuel tank and the fuselage; and
two or more second coupler assemblies that removably secures a second side of the auxiliary fuel tank to the fuselage in a manner that allows for two degrees of movement between the auxiliary fuel tank and the fuselage,
wherein each of the first coupler assemblies and the second coupler assemblies comprises:
- a first coupler that includes a first attachment member that supports a body with a hollow channel having a centerline disposed longitudinally in the fuselage between a first end and a second end, and a slot between an outer surface of the body and the hollow channel; and
- a second coupler that includes an engagement member, a second attachment member, and an arm extending between the engagement member and the second attachment member,
- wherein the engagement member is slidably received within the hollow channel from the first end,
- wherein a position of the engagement member is modifiable relative to the arm, and
- wherein the engagement member fits slidably within the hollow channel to engage with the body of the first coupler, and the arm extends through the slot.

18. The aircraft of claim 17, wherein:
the hollow channel of each first coupler has an elliptical cross-section (902) between the first end and the second end, and
the engagement member of each first coupler has an elliptical shape (1008) to fit slidably within the hollow channel.

19. The aircraft of claim 18, wherein:
the hollow channel of each second coupler has a u-shaped cross-section between the first end and the second end,
the engagement member of each second coupler comprises a roller that fits slidably within the hollow channel with an axis of rotation parallel to the centerline of the hollow channel, and
the slot between the outer surface of the body and the hollow channel of the second coupler opens towards one of an inboard direction and an outboard direction of the fuselage.

20. The aircraft of claim 19, wherein:
each roller includes a spherical bearing with an eccentric casing that modifies a position of the axis of rotation relative to the arm.

* * * * *